US010616319B2

(12) United States Patent
Kommula et al.

(10) Patent No.: US 10,616,319 B2
(45) Date of Patent: Apr. 7, 2020

(54) METHODS AND APPARATUS TO ALLOCATE TEMPORARY PROTOCOL PORTS TO CONTROL NETWORK LOAD BALANCING

(71) Applicant: VMware, Inc., Palo Alto, CA (US)

(72) Inventors: Raja Kommula, Cupertino, CA (US); Raj Yavatkar, Saratoga, CA (US); Thayumanavan Sridhar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 136 days.

(21) Appl. No.: 15/890,050

(22) Filed: Feb. 6, 2018

(65) Prior Publication Data
US 2019/0245915 A1 Aug. 8, 2019

(51) Int. Cl.
H04L 12/28 (2006.01)
H04L 29/08 (2006.01)
H04L 12/26 (2006.01)
H04L 12/803 (2013.01)
H04L 12/911 (2013.01)
H04L 12/709 (2013.01)
H04L 29/06 (2006.01)

(52) U.S. Cl.
CPC ...... H04L 67/1023 (2013.01); H04L 43/0882 (2013.01); H04L 45/245 (2013.01); H04L 47/125 (2013.01); H04L 47/726 (2013.01); H04L 29/06 (2013.01)

(58) Field of Classification Search
None
See application file for complete search history.

(56) References Cited

U.S. PATENT DOCUMENTS

| 2003/0112810 | A1* | 6/2003 | Nakabayashi | ........ H04L 12/462 370/401 |
| 2004/0024906 | A1* | 2/2004 | Valdevit | .................. H04L 45/12 709/241 |
| 2009/0046583 | A1 | 2/2009 | Towster et al. | |
| 2009/0073894 | A1* | 3/2009 | Nimon | .................... H04L 12/18 370/254 |
| 2014/0313932 | A1 | 10/2014 | Saltsidis | |
| 2015/0172210 | A1 | 6/2015 | Sarkar et al. | |
| 2016/0197824 | A1 | 7/2016 | Lin et al. | |
| 2016/0197853 | A1 | 7/2016 | Kumar et al. | |
| 2017/0264490 | A1 | 9/2017 | Kunda et al. | |
| 2018/0176036 | A1 | 6/2018 | Butcher et al. | |
| 2018/0367981 | A1 | 12/2018 | Desai et al. | |

* cited by examiner

Primary Examiner — Natisha D Cox
(74) Attorney, Agent, or Firm — Hanley, Flight & Zimmerman, LLC

(57) ABSTRACT

A disclosed example apparatus to manage port allocations for network load balancing includes a telematics network information collector to collect bandwidth utilizations corresponding to physical links of network paths between a source and a destination, the network paths including at least one of a link aggregation group hop or an equal cost multi-path hop; a cost calculator to determine network path costs corresponding to unused protocol ports of a physical server host based on the bandwidth utilizations; a comparator to compare the network path costs; and a port allocator to, based on the comparison, allocate one of the unused protocol ports to an application.

21 Claims, 20 Drawing Sheets

```
port_allocator(sport, dport, sip, dip, ptype)
    unused_port_list = {List of unused ports on the host}
    switch_list = {List of switches in the network}
    sport = Source port
    dport = Destination port. // Set to 0 if unknown
    sip = Source IP Address
    dip = Destination IP Address
    ptype = Protocol Type if sport == reserved or well-known port
        return sport
    endif foreach P in unused_port_list
        cost = 0
        foreach S in switch_list
            nexthop = find_egress_interface(dip)
            if (nexthop is LAG)
                hash = calculate_LAG_hash(S, sip, dip, P, dport, ptype)
                egress_port = find_egress_LAG_interface(S, nexthop, hash)
                cost += (current utilization of egress port /
                         speed of egress_port) * 100
            elseif(nexthop is ECMP)
                hash = calculate_ECMP_hash(S, sip, dip, P, dport, ptype)
                egress_port = find_egress_ECMP_interface(S, nexthop, hash)
                cost += (current utilization of egress port /
                         speed of egress_port) * 100
            else
                cost += (current utilization of nexthop /
                         speed of nexthop) * 100
            endif
        endfor
        port_cost_array[P] = cost
    endfor
    // return port with least cost
    quick_sort(port_cost_array)
    return port_cost_array[0]
```

1300

PORT ALLOCATOR
FIG. 13

1400 

```
egress_port_translator(Packet P from guest OS)
        g_sport = source port in P
        g_dport = destination port in P
        sip = Source IP in P
        dip = Destination IP in P
        ptype = Protocol Type in P
        t_sport = port_allocator(g_sport, g_dport, sip, dip, ptype)
        port_translation_table[t_sport] = sport
        replace source port in P with t_sport
        Send P to network
```

PORT TRANSLATOR - EGRESS

FIG. 14

1500 

```
ingress_port_translator(Packet P from network)
        t_dport = Destination Port from P
        dport = port_translation_table[t_dport]
        replace destination port in P with dport
        send P to guest OS
```

PORT TRANSLATOR - INGRESS

FIG. 15

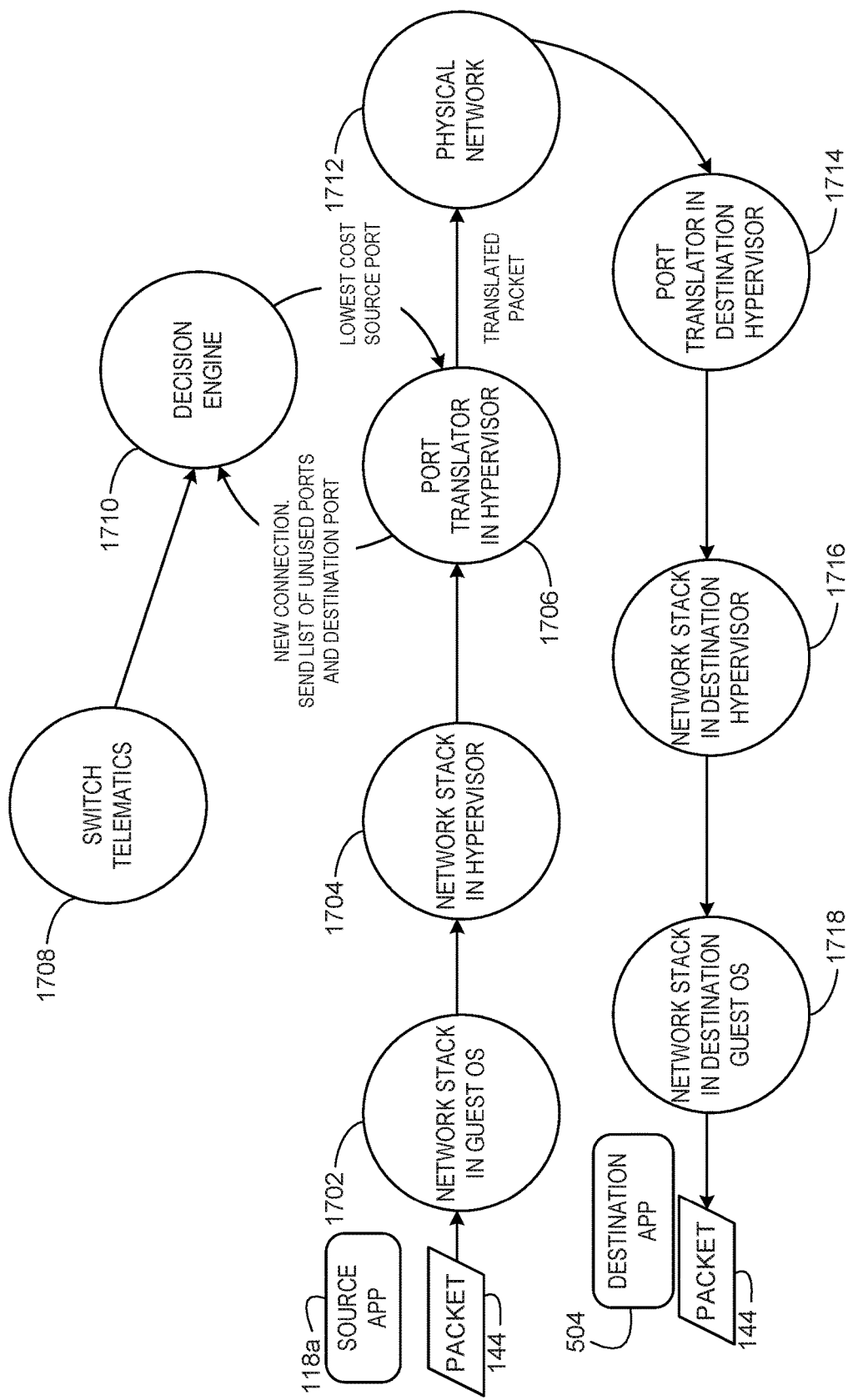

METHODS AND APPARATUS TO ALLOCATE TEMPORARY PROTOCOL PORTS TO CONTROL NETWORK LOAD BALANCING

FIELD OF THE DISCLOSURE

The present disclosure relates generally to network-based computing and, more particularly, to methods and apparatus to methods and apparatus to allocate temporary protocol ports to control network load balancing.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

BRIEF DESCRIPTION OF THE DRAWINGS

FIG. 13 is example pseudocode representative of machine readable instructions that may be executed to implement the port manager of FIGS. 1A-1C, FIG. 3, and/or FIG. 4 to allocate temporary protocol ports to applications to control network load balancing.

FIG. 14 is example pseudocode representative of machine readable instructions that may be executed to implement the port manager of FIGS. 1A-1C, FIG. 3, and/or FIG. 4 to translate temporary protocol ports of egress packets received from a guest OS for sending to a network.

FIG. 15 is example pseudocode representative of machine readable instructions that may be executed to implement the port manager of FIGS. 1A-1C, FIG. 3, and/or FIG. 4 to translate temporary protocol ports of ingress packets received from a network for delivery to a guest OS.

FIG. 17 is a packet flow state diagram representative of an example flow and processing of network packets between source and destination applications based on examples disclosed herein.

Figure 1A:
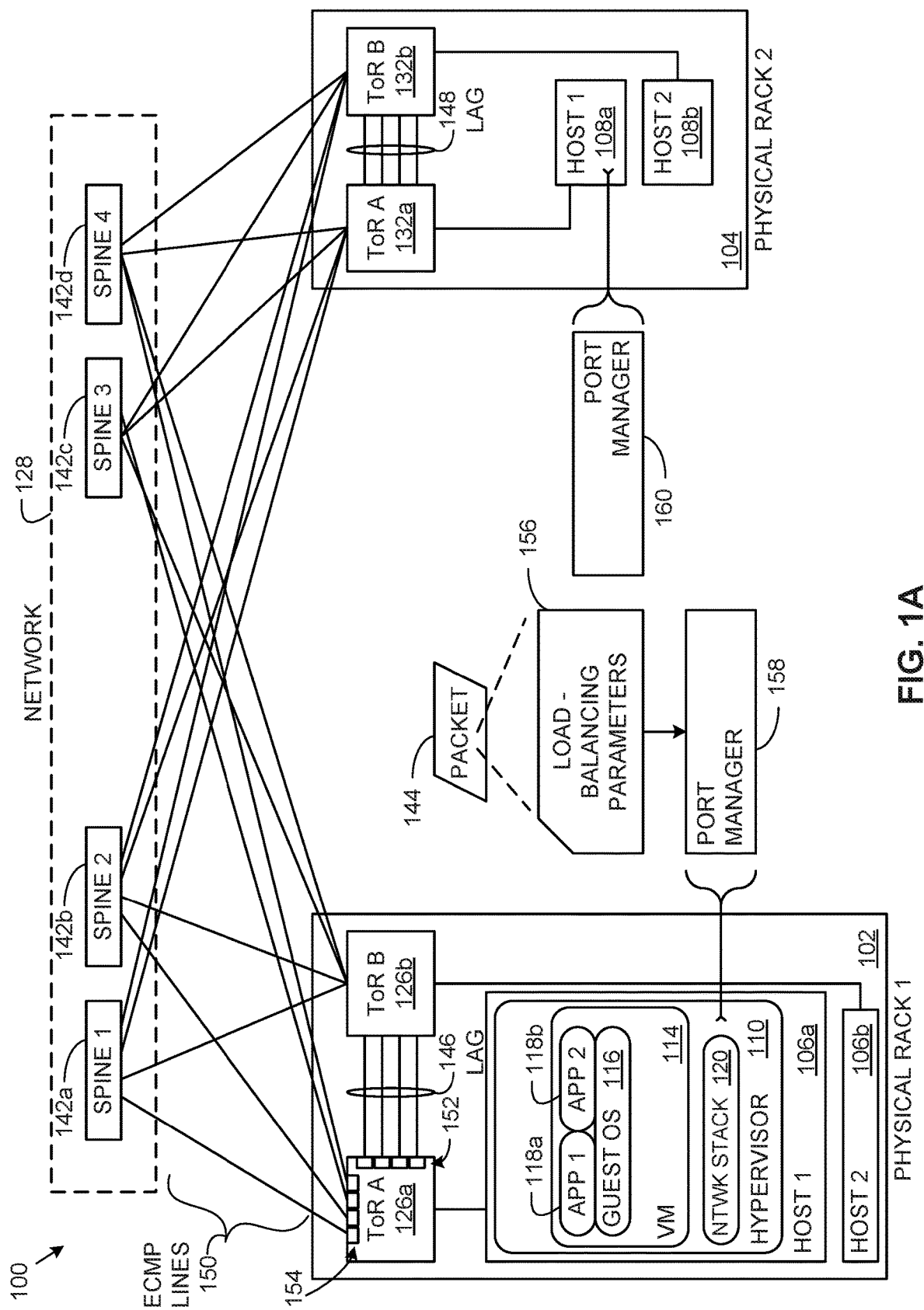
FIG. 1A is an example multi-rack system having an example port manager to allocate temporary protocol ports to control network load balancing in a software defined data center (SDDC).

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Examples disclosed herein allocate temporary protocol ports to applications running in guest operating systems (OSs) of virtual machines (VMs) to control network load balancing of network packets sent by those applications. Examples disclosed herein are described in connection with Link Aggregation Groups (LAG) and an Equal-Cost Multi-Path (ECMP) routing protocol. LAGs may be implemented using a Link Aggregation Control Protocol (LACP) to group or pool multiple links into one virtual link having a total bandwidth capability that is the cumulative speeds of the individual grouped links. Thus, if four 10 gigabit per second (Gbps) links are grouped into a LAG, the total bandwidth capability of the LAG is 40 Gbps. The ECMP routing protocol determines a next segment or path along which to route a network packet to a subsequent switch or destination. For example, a switch employing ECMP may be connected to multiple other switches via respective network links. The switch employs ECMP routing to determine the next switch to which to send a network packet based on an ECMP routing analysis of the links corresponding to the available switches.

When a network packet is sent by a source device, the network packet includes a source internet protocol (IP) address and a destination IP address. A network path for the packet between the source and destination may include multiple hops. As defined herein, a hop is a segment between two nodes (e.g., between two switches or between a server host and a switch) along a network path. As a network packet traverses a network path with multiple hops, and an intermediary switch receives the network packet, the switch forwards or routes the network packet to a next switch of a next hop toward the final destination IP address of the network packet. This forwarding process is repeated at each switch of the multiple hops until the network packet is delivered to its final destination IP address.

In some examples disclosed herein, a network path of a packet includes one or more LAG hops at which a switch or server host forwards packets to a next hop or to a destination IP address via one of a plurality of links of a LAG. In some examples disclosed herein, a network path of a packet includes one or more ECMP hops in which a switch or server host routes or forwards a packet by using the ECMP routing protocol to select one of a plurality of available next hop switches to forward the packet. When a network packet arrives at a switch that is to forward the packet via a LAG or using the ECMP routing protocol, the switch must select one of a plurality of egress links via which to forward the packet. To do this, the switch generates a hash value based on network parameter values of the packet and performs a modulo operation on the hash value to select one of the plurality of available egress links for use in forwarding the packet to a next node. Example hash routing schemes that may be employed for hash-based routing over LAG hops and/or ECMP hops may be based on generating hashes based on source and destination Media Access Control (MAC) addresses, generating hashes based source and destination IP addresses, and/or generating hashes based on source and destination IP address and network protocol ports (e.g., TCP ports, UDP ports, etc. In addition, example hash routing schemes may be based on round robin selections of egress ports at switches. Example network parameters of packets are shown in Table 1 below.

TABLE 1

| Network Parameters of a Packet |
| --- |
| Source IP Address |
| Destination IP Address |
| Source Protocol Port |
| Destination Protocol Port |
| Protocol Type (e.g., TCP, UDP, etc.) |

In Table 1 above, the source IP address is the address of the sending device, the destination IP address is the IP address of the final destination device, the source protocol port is the source port assigned to the packet by a network protocol used to transmit the packet, the destination protocol port is the destination port assigned by the network protocol, and the protocol type is the type of network protocol used to send the packet. The source and destination IP addresses can be allocated automatically by a Dynamic Host Configuration Protocol (DHCP) or manually by a user/administrator. The source and destination ports are allocated by a network stack (e.g., a TCP/IP network stack, a UDP/IP network stack, etc.) in the OS. The protocol type may be selected by a user/administrator based on, for example, reliability requirements for communications. Example network protocols that can be used to send packet communications and assign protocol ports to such packets include the Transmission Control Protocol (TCP) and the User Datagram Protocol (UDP). Examples disclosed herein may be implemented using the TCP protocol and/or the UDP protocol, and/or any other suitable network protocol that assigns ports to network packets.

Switches that forward packets via LAG hops or ECMP hops generate hashes based on the network parameters shown above in Table 1 for those packets. For example, if a switch generates 16-bit hash values, a hash can be one of 65,536 values. If the LAG hop or ECMP hop at a switch has four available egress links for forwarding the network packet, the switch assigns the modulus of hash values 0 to 16,383 to the first link, the modulus of hash values 16,384 to 32,767 to the second link, the modulus of hash values 32,768 to 49,151 to the third link, and the modulus of hash values 49,152 to 65,535 to the fourth link. In this manner, packets having network parameters resulting in hash values 0 to 16,383 are forwarded by the switch via the first link, packets having network parameters resulting in hash values 16,384 to 32,767 are forwarded by the switch via the second link, packets having network parameters resulting in hash values 32,768 to 49,151 are forwarded by the switch via the third link, and packets having network parameters resulting in hash values 49,152 to 65,535 are forwarded by the switch via the fourth link.

Since hash values are deterministic in that a generated hash value will always be the same for the same input values, network packets sent by the same application or the same guest OS of a VM have the same network parameters and, thus, will always result in the same hash values. In addition, network packets sent between the same source and destination nodes by different applications that use the same network protocol will have similar network parameters because the values of the source and destination IP addresses and the protocol type parameter do not change. For example, Table 2 below shows network parameter values of packets corresponding to two applications running in the same guest OS.

TABLE 2

Network Parameter Values for Packets of Two Applications

| Parameter Name | App 1 | App 2 |
| --- | --- | --- |
| Source IP Address | 192.168.100.10 | 192.168.100.10 |
| Destination IP Address | 192.168.100.20 | 192.168.100.20 |
| Source Protocol Port | 1010 | 2010 |
| Destination Protocol Port | 1020 | 2020 |
| Protocol Type | 6 | 6 |

Network parameter values such as those shown in Table 2 above remain the same during the life of a network session. Thus, all packets of the first application (App 1) will be routed the same because they will result in the same hash value based on the first application's network parameter values, and all packets of the second application (App 2) will be routed the same because they will result in the same hash value based on the second application's network parameter values. In the example of Table 2 above, the source and destination IP addresses for the two applications are the same because they are communicating between the same source and destination nodes. In addition, the protocol type is 6 (e.g., the TCP protocol) because both applications are using the same network protocol to send network packets. The only differences are in the source and destination protocol ports of the first application (App 1) differing from the source and destination protocol ports of the second application (App 2). However, the differences are small such that a switch handling packets from both applications will generate similar hash values for the packets from both applications. Such similar hash values can cause a switch to select the same egress link for forwarding the packets of both applications to a next node. In addition, switches at LAG hops and ECMP hops will always select the same links for packets having the same network parameter values because those network parameter values result in the same hash values. This becomes a problem when one or more applications and/or a guest OS send(s) a considerable number of packets having the same or similar network parameter values resulting in the same or similar hash values because a switch will send most or all packets along the same egress link or along fewer than all of its available egress links. For example, a switch may forward all packets on one of four available egress links or on two of four available egress links in accordance with the packets' hash values while the remaining non-selected egress links remain underutilized. Sending the packets via the same egress links or fewer than all available egress links at a LAG hop or an ECMP hop can lead to severe congestion, causing the application(s) or guest OS that originated the packet traffic to experience a slowdown in network throughput.

Examples disclosed herein control link selection at LAG hops and/or ECMP hops to perform better load balancing of network traffic at those hops than can be accomplished using prior LAG hop routing and/or ECMP hop routing. To control such link selection, examples disclosed herein temporarily modify network parameter values of Table 1 shown above for packets so that hash values generated by switches at LAG hops and/or ECMP hops can differ across packets in a manner that causes significant differences between hash values of the different packets. Controlling variations across hash values of network packets as disclosed herein in turn controls egress link selections by switches at LAG hops and/or ECMP hops. In this manner, examples disclosed herein can substantially reduce or eliminate congestion related to forwarding packets at LAG hops and/or ECMP hops. To modify the network parameter values of packets, examples disclosed herein use telematics to collect network information indicative of bandwidth utilizations for egress links between source and destination nodes, analyze the collected network information to allocate temporary source protocol ports that will result in hash values corresponding to lesser-utilized egress links at LAG hops and/or ECMP hops, and temporarily replace the original source protocol ports in the packets with the temporary source protocol ports so that the packets include the temporary source protocol ports while they are routed via one or more hops along a network path. In this manner, when a switch at a LAG hop or an ECMP hop generates hash values for a considerable number of packets between the same source and destination IP addresses, different temporary source protocol ports in those packets will result in different hash values, causing the switch to forward the network packets to a next node along different egress links. This improves on prior egress link selection techniques at LAG hops and/or ECMP hops that forward all or most network packets having the same source IP address (e.g., of a source host) and the same destination IP address (e.g., of a destination host) on one egress link or fewer than all available egress links based on the same or similar hash values being generated using the same or similar network parameters of those packets.

Examples disclosed herein may be implemented in connection with network-based computing such as cloud computing which is based on the deployment of many physical resources across a network, virtualizing the physical resources into virtual resources, and provisioning the virtual resources in software defined data centers (SDDCs) for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing network resources that are provided in SDDCs based on Hyper-Converged Infrastructure (HCI). In examples disclosed herein, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a VM. In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and an OS virtualization environment. In such a data center, a workload may be deployed to any of the virtualization environments. Through techniques to monitor both physical and virtual infrastructure, examples disclosed herein provide visibility into the virtual infrastructure (e.g., VMs, virtual storage, virtual networks and their control/management counterparts) and the physical infrastructure (servers, physical storage, network switches).

Prior converged and hyper-converged systems enable deploying and operating private clouds by offering an integrated system. However, most of such prior products lack a single governing entity that has visibility into and end-to-end control over an entire (virtual and physical) infrastructure. The lack of a single governing entity makes it difficult to correlate related events such as relating switch congestion to a particular traffic source in a VM, or taking preemptive traffic management action (e.g., a scheduled VM migration event could be used to proactively select an end-to-end network path that does not impact the software-defined data storage traffic), or reflecting network I/O control (NIOC) (e.g., VMWARE ESXI NIOC) configurations at the switch level for end-to-end Quality of Storage (QoS) control during traffic events like software-defined data storage rebalancing. Examples disclosed herein overcome limitations of prior systems by enabling observing and controlling both virtual and physical infrastructures of self-contained private clouds. Examples disclosed herein collect telematics data from switches, hosts, and hypervisor-based virtual infrastructure and take remedial actions based on telematics analyses and/or user-configured policies.

Figure 2:
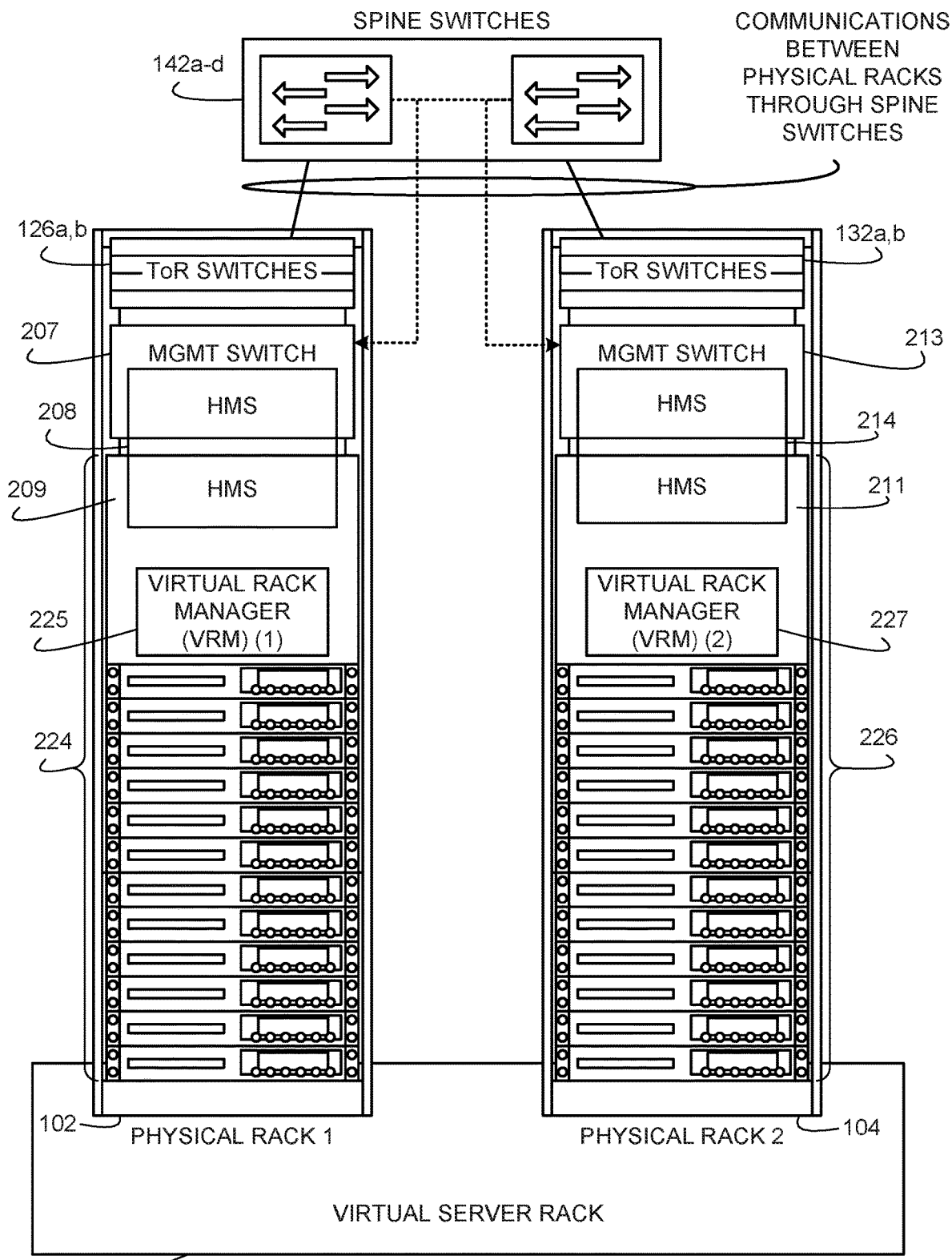
FIG. 2 depicts the example physical racks of FIG. 1A in an example virtual server rack deployment in which the temporary protocol port allocation examples of FIGS. 1B and 1C may be implemented in accordance with teachings of this disclosure.

Examples disclosed herein may be employed with HCI-based SDDCs deployed using virtual server rack systems such as the virtual server rack 206 of FIG. 2. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 2 and 3, multi-rack deployments can include Top-of-the-Rack (ToR) switches (e.g., leaf switches) and spine switches connected using a leaf-spine architecture. A virtual server rack system also includes software-defined data storage (e.g., storage area network (SAN), VWWARE® VIRTUAL SAN™) distributed across multiple hosts for redundancy and virtualized networking software (e.g., VMWARE NSX™).

FIG. 1A is an example multi-rack system 100 having an example port manager 158 that accesses an example load balancing parameters table to allocate temporary protocol ports to packets to control network load balancing in a SDDC. The example multi-rack system 100 includes a first physical rack 102 and a second physical rack 104. The example first physical rack 102 includes a first physical host server 106*a* and a second physical host server 106*b*. The example second physical rack 104 includes a first physical host server 108*a* and a second physical host server 108*b*. The example first physical host server 106*a* of the first physical rack 102 is shown in detail. Although similar details are not shown for the second physical host server 106*b* or for the physical host servers 108*a*,*b* of the second physical rack 104, those physical host servers 106*b* and 108*a*,*b* are substantially similar to the first physical host server 106*a* of the first physical rack 102. As used herein, the term "host" refers to a functionally indivisible unit of the physical hardware resources (e.g., the example physical hardware resources 224, 226 of FIG. 2), such as a physical server that is configured or allocated, as a whole, to a virtual rack and/or workload; powered on or off in its entirety; or may otherwise be considered a complete functional unit.

In the illustrated example of FIG. 1A, the first host 106*a* of the first physical rack 102 executes an example hypervisor 110, which provides local virtualization services to create an example virtual environment in the host 106a. The example hypervisor 110 may be implemented using any suitable hypervisor (e.g., VMWARE® ESX® hypervisor, Microsoft HYPER-V® hypervisor, and Kernel Based Virtual Machine (KVM)). In the illustrated example of FIG. 1A, the hypervisor 110 executes one or more VMs (e.g., an example VM 114). In the illustrated example of FIG. 1A, the example VM 114 is shown executing an example guest OS 116, an example first application 118a (e.g., APP 1), and an example second application 118b (e.g., APP 2). The first and second applications 118a,b execute on the guest OS 116 such that when the first and second applications 118a,b send and receive network packets, the network packets flow through the guest OS 116 and are processed by a guest network protocol/IP stack of the guest OS 116.

In the illustrated example of FIG. 1A, the hypervisor 110 also executes an example network stack 120. The example network stack 120 is a networking program (e.g., firmware and/or software) that includes instructions to control the egress and ingress flow of network packets between the hypervisor 110 and nodes outside the host 106a (e.g., the second physical host server 106b of the first physical rack 102 or the physical host servers 108a,b of the second physical rack 104). For example, the network stack 120 controls the forwarding of egress network packets from the guest OS 116 towards destination nodes based on the destination IP addresses of the network packets. In addition, the network stack 120 controls delivering ingress packets to corresponding guest OSs (e.g., the guest OS 116) and/or corresponding applications (e.g., the applications 118a,b) based on destination IP addresses and/or destination protocol ports of the packets. For example, the guest OS 116 is assigned a corresponding IP address (e.g., by the network virtualizer 312 of FIG. 3) that the network stack 120 uses to deliver network packets based on destination IP addresses of the network packets that match the IP address of the guest OS. In addition, the guest OS 116 assigns unique protocol ports to the applications 118a,b that a guest network protocol/IP stack running in the guest OS 116 uses to deliver network packets to corresponding ones of the applications 118a,b based on destination protocol ports of the network packets that match the protocol ports assigned to the applications 118a,b. The network stack 120 executing in the hypervisor 110 may be implemented as a TCP/IP stack, a UDP/IP stack, or any other suitable stack for controlling such packet flow.

The example first physical rack 102 includes first and second ToR switches 126a,b (e.g., first and second leaf switches 126a,b) that connect via an example network 128 to first and second ToR switches 132a,b (e.g., first and second leaf switches 132a,b) of the second physical rack 104. In the illustrated example, the first and second ToR switches 126a,b of the first physical rack 102 are connected to the first and second ToR switches 132a,b of the second physical rack 104 via spine switches 142a-d of the network 128. The ToR switches 126a,b and 132a,b can communicate with one another via a number of paths between the ToR switches 126a,b and 132a,b and the spine switches 142a-d.

In the illustrated example, a network packet 144 from the first application 118a to the first host 108a of the second physical rack 104 may be routed along a number of network paths of the illustrated example of FIG. 1A that include one or more LAG hops and/or one or more ECMP hops. For example, the first ToR switch 126a and the second ToR switch 126b of the first physical rack 102 are connected via a first LAG 146, and the first ToR switch 132a and the second ToR switch 132b of the second physical rack 104 are connected via a second LAG 148. The example LAGs 146, 148 are LAG hops. In addition, the ToR switches 126a,b and 132a,b are connected to the spine switches 142a-d via a plurality of ECMP links 150, which form a plurality of ECMP hops. In the illustrated example, each of the ToR switches 126a,b and 132a,b and each of the spine switches 142a-d includes a plurality of egress ports to which ones of the links of the LAGs 146, 148 and ones of the links of the ECMP links 150 are connected. In the illustrated example of FIG. 1A, example egress ports 152 of the first ToR switch 126a of the first physical rack 102 are shown connecting the links of the LAG 146 to the second ToR switch 126b of the first physical rack 102. Also in the illustrated example of FIG. 1A, example egress ports 154 of the first ToR switch 126a of the first physical rack 102 are shown connecting ones of the ECMP links 150 to ones of the spine switches 142a-d.

Figure 1B:
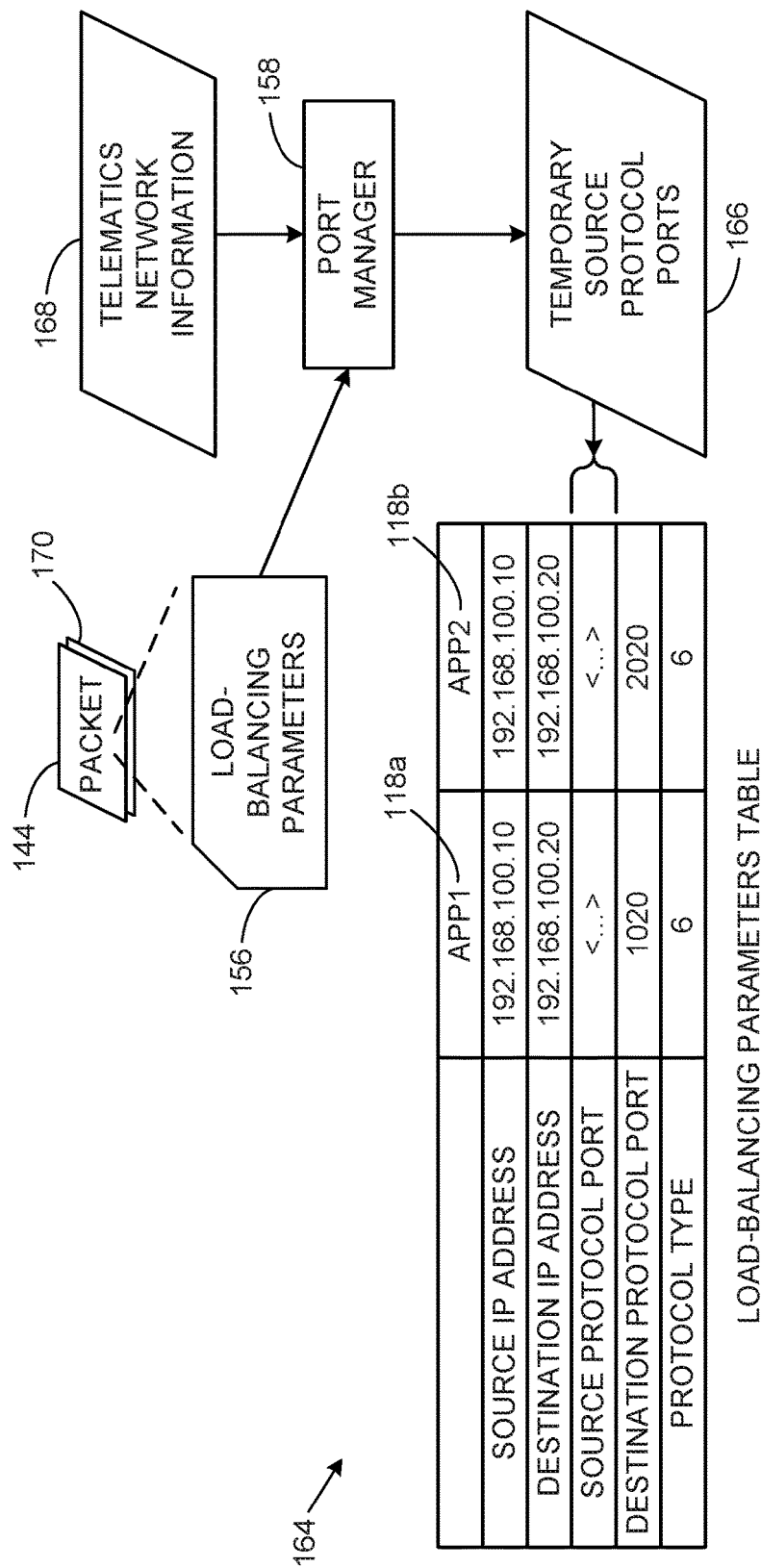
FIG. 1B illustrates the example port manager of FIG. 1A allocating temporary protocol ports in load balancing parameters of applications based on collected telematics network information.

A network path of the network packet 144 between a source (e.g., the first application 118a) and a destination (e.g., an application in the first host 108a of the second physical rack 104) is formed of multiple segments that may include one or more of the LAG 146, the ECMP links 150, and/or the LAG 148. In the illustrated example, the selections of segments of the LAG 146, the ECMP links 150, and/or the LAG 148 that will be used to form the network path of the packet 144 are based on load-balancing parameters 156 of the packet 144. Turning briefly to FIG. 1B, the example load-balancing parameters 156 are shown in an example load-balancing parameters table 164 and include a source IP address, a destination IP address, a source protocol port, a destination protocol port, and a protocol type. The example fields of the load-balancing parameters table 164 are representative of fields in headers of network packets that are used by nodes to route the network packets through network paths. The source IP address is the IP address of the guest OS 116 of FIG. 1A. The destination IP address is the IP address of a guest OS (e.g., which is a destination of the packet 144) running on the first host 108a or the second host 108b of the second physical rack 104. The source protocol port is a network protocol port number assigned by the source (e.g., the guest OS 116) of the packet 144. The destination protocol port is a network protocol port number corresponding to the destination (e.g., a guest OS in the second physical rack 104) of the packet 144. In the illustrated example, the network protocol for assigning the source and destination protocol ports may be implemented using the TCP protocol and/or the UDP protocol, and/or any other suitable network protocol that assigns network ports to network packets. The protocol type is a numerical value indicative of the network protocol used to assign the source and destination protocol ports.

In the illustrated example, the first ToR switch 126a controls how the network packet 144 will be forwarded via a next segment or next hop of the overall network path of the packet 144. That is, the first ToR switch 126a uses each of the egress ports 152, 154 to forward the network packet 144 two a next node (e.g., a next switch) along a next segment or next hop of a network path towards a destination IP address of the network packet 144. In some examples, the first ToR switch 126a of the first physical rack 102 selects one of the egress ports 152 to forward the network packet 144 to the second ToR switch 126b via a link of the LAG 146. For example, the first ToR switch 126a uses hash-based routing by generating a hash value based on the load-balancing parameters 156 and selecting one of the egress ports 152 corresponding to the modulus of the hash value. In some examples, the first ToR switch 126a of the first physical rack 102 selects one of the egress ports 154 to forward the network packet 144 to one of the spine switches 142a-b. For example, the first ToR switch 126a uses hash-based routing by generating a hash value based on the load-balancing parameters 156 and selecting one of the egress ports 154 corresponding to the modulus of the hash value.

In the illustrated example, to improve load-balancing of network packets across the links of the egress ports 152,154 and other egress ports of others of the switches 126b, 132a,b, 142a-d, the hypervisor 110 of the first host 106a of the first physical rack 102 is provided with the example port manager 158 (e.g., a first port manager 158). The example port manager 158 modifies the load-balancing parameters 156 as described below in connection with FIG. 1C to control values of hashes generated at the switches 126a,b, 132a,b, 142a-d during selections of egress ports for forwarding packets along a next hop. In the illustrated example, the port manager 158 is in the network stack 120 in the hypervisor 110. In other examples, the port manager 158 is implemented in the hypervisor 110 separate from the network stack 120. In the illustrated example, an example second port manager 160 is also provided in the first host 108a of the second physical rack 104. The second port manager 160 is substantially similar or identical to the first port manager 158. The first port manager 158 modifies the load-balancing parameters 156 for packets sent and received by guest OSs (e.g., the guest OS 116) running on the first host 106a of the first physical rack 102. The second port manager 160 modifies load-balancing parameters for packets sent and received by guest OSs running on the first host 108a of the second physical rack 104.

FIG. 1B illustrates the example first port manager 158 of FIG. 1A allocating temporary source protocol ports 166 in the load balancing parameters 156 of the applications 118a,b of FIG. 1A based on collected telematics network information 168. In the illustrated example of FIG. 1B, the port manager 158 processes the first packet 144 corresponding to the first application 118a and processes a second packet 170 corresponding to the second application 118b. The first packet 144 includes example load-balancing parameters 156 corresponding to the first application 118a. The second packet 170 includes example load-balancing parameters 156 corresponding to the second application 118b. The example load-balancing parameters table 164 shows the example load-balancing parameters 156 for the first application 118a and for the second application 118b.

In the illustrated example of FIG. 1B, the port manager 158 analyzes bandwidth utilizations of different hops between a source IP address (e.g., of the first host 106a of the first physical rack 102) and a destination IP address (e.g., of the second host 108a of the second physical rack 104) of the packets 144, 170 to determine network path costs associated with different network protocol ports that are available to assign as a temporary source protocol port 166. The port manager 158 uses the calculated network path costs to determine the available network protocol ports that result in network paths (e.g., combinations of egress ports of nodes) having lower bandwidth utilizations and, thus, being better candidates for better network throughput because of lower or no network congestion. For the application 118a, the example port manager 158 compares the calculated network path costs to determine a lowest network path cost and selects a protocol port number to use as a temporary source protocol port 166 that will result in nodes generating hash values that route the packet along egress ports of the network path that amount to the least network path cost. The example port manager 158 replaces/modifies the actual source protocol port number assigned to the guest OS 116 in the load balancing parameters 156 of the packet 144 with the temporary source protocol port 166. The example port manager 158 performs the same network path cost analysis for the network packet 170 of the second application 118b to select a corresponding temporary source protocol port 166, and replaces/modifies the actual source protocol port number assigned at the guest OS 116 in the load balancing parameters 156 of the packet 170 with the temporary source protocol port 166.

Figure 1C:
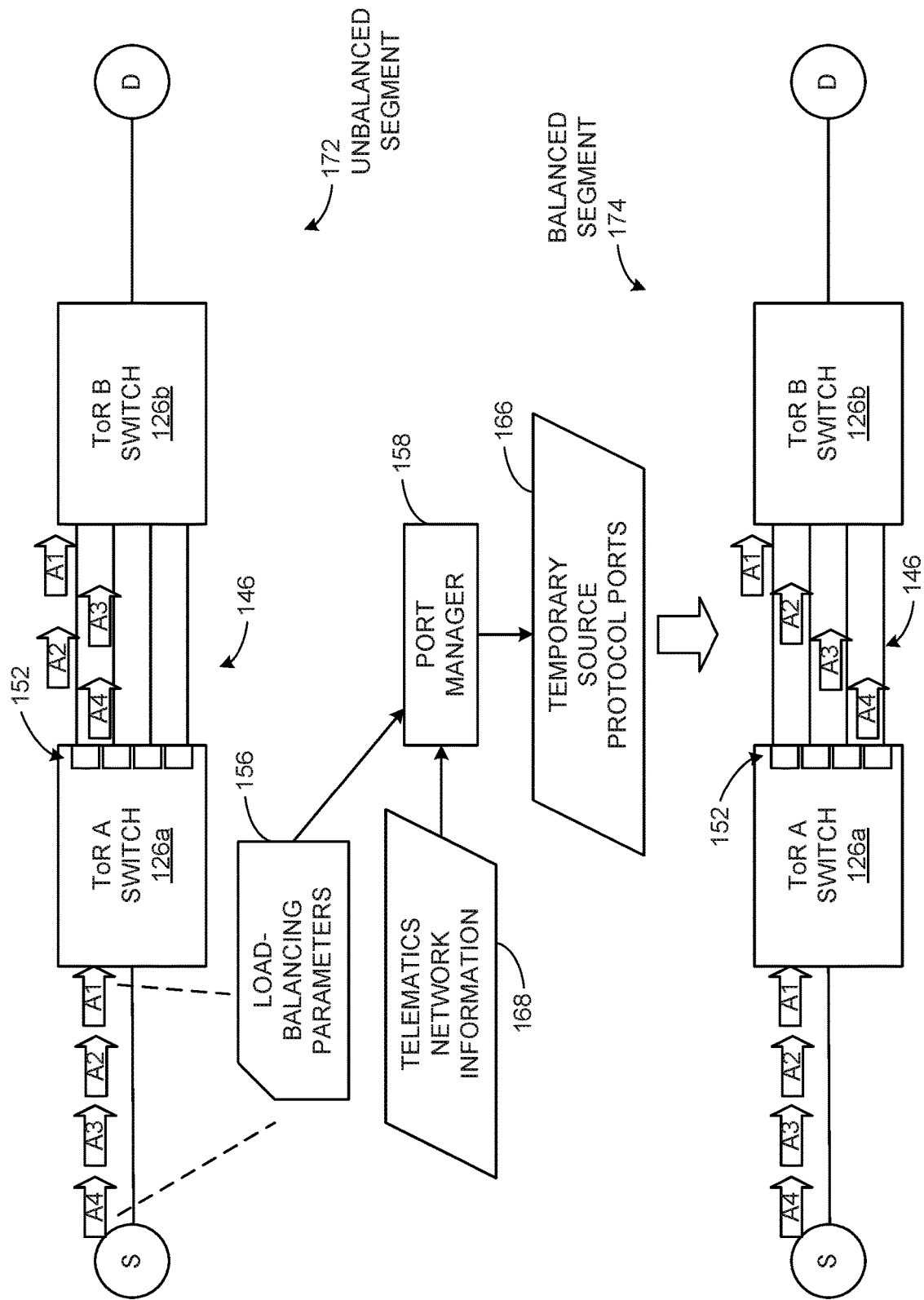
FIG. 1C illustrates the example port manager of FIG. 1A providing the temporary protocol port allocations of FIG. 1B to control load balancing of network packets from multiple applications.

FIG. 1C illustrates the example port manager 158 of FIG. 1A providing the temporary source protocol ports 166 of FIG. 1B to control load balancing of network packets from multiple applications A1-A4. The example of FIG. 1C shows an example unbalanced network path segment 172 as the first LAG 146 between the first ToR switch 126a and the second ToR switch 126b. In the example unbalanced network path segment 172, the first ToR switch 126a uses the original load-balancing parameters 156 corresponding to the packets of the applications A1-A4 (e.g., assigned to the applications A1-A4 by the originating guest OS 116 of FIG. 1A) to select links of the LAG 146 along which to route the packets. However, as shown, such use of the original load-balancing parameters 156 results in the first ToR switch 126a selecting only two of the egress ports 152 for sending the packets of the applications A1-A4 to the second ToR switch 126b, which leaves the other two links of the LAG 146 underutilized and increases congestion on the two selected links.

The port manager 158 of the illustrated example uses the load-balancing parameters 156 and the telematics network information 168 to determine the temporary source protocol ports 166. By replacing the actual source protocol ports of the load-balancing parameters 156 corresponding to applications A1-A4, the first ToR switch 126a performs better load-balancing by selecting four of the egress ports 152 for use in sending the network packets corresponding to the different applications A1-A4 to the second ToR switch 126b. Such selections of the egress ports 152 based on the temporary source protocol ports 166 changes the unbalanced network path segment 172 to the balanced network path segment 174 in which packets for each of the applications A1-A4 are shown being forwarded along separate respective links of the LAG 146.

FIG. 2 depicts the example physical racks 102, 104 of FIG. 1A in an example deployment of a virtual server rack 206 in which the controlling of network load balancing based on selection of the temporary source protocol ports 166 may be implemented in accordance with teachings of this disclosure. The virtual server rack 206 of the illustrated example enables representing hardware resources (e.g., physical hardware resources 224, 226) as logical/virtual resources. In some examples, the virtual server rack 206 includes a set of physical units (e.g., one or more racks) with each unit including hardware such as server nodes (e.g., compute+storage+network links), network switches, and, optionally, separate storage units. From a user perspective, the example virtual server rack 206 is an aggregated pool of logic resources exposed as one or more VMWARE ESXI™ clusters along with a logical storage pool and network connectivity. In examples disclosed herein, a cluster is a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 includes the example ToR switches 126*a,b* of FIG. 1A, an example management switch 207, and an example server host node(0) 209. In the illustrated example, the management switch 207 and the server host node(0) 209 run a hardware management system (HMS) 208 for the first physical rack 102. The second physical rack 104 of the illustrated example is also provided with the example ToR switches 132*a,b* of FIG. 1A, an example management switch 213, and an example server host node(0) 211. In the illustrated example, the management switch 213 and the server host node (0) 211 run an HMS 214 for the second physical rack 104.

In the illustrated example, the HMS 208, 214 connects to server management ports of the server host node(0) 209, 211 (e.g., using a baseboard management controller (BMC)), connects to ToR switch management ports (e.g., using 1 Gbps links) of the ToR switches 126*a,b*, 132*a,b*, and also connects to spine switch management ports of the spine switches 142*a-d*. In the illustrated example, the ToR switches 126*a, b*, 132*a,b* implement leaf switches such that the ToR switches 126*a,b*, 132*a,b*, and the spine switches 142*a-d* are in communication with one another in a leaf-spine switch configuration. These example connections form a non-routable private Internet protocol (IP) management network for out-of-band (OOB) management. The HMS 208, 214 of the illustrated example uses this OOB management interface to the server management ports of the server host node(0) 209, 211 for server hardware management. In addition, the HMS 208, 214 of the illustrated example uses this OOB management interface to the ToR switch management ports of the ToR switches 126*a,b*, 132*a,b* and to the spine switch management ports of the spine switches 142*a-d* for switch management. In examples disclosed herein, the ToR switches 126*a,b*, 132*a,b* connect to physical network interface cards (NICs) (e.g., using 10 Gbps links) of server hosts in the physical racks 102, 104 for downlink communications and to the spine switches 142*a-d* (e.g., using 40 Gbps links) for uplink communications. In the illustrated example, the management switch 207, 213 is also connected to the ToR switches 126*a,b*, 132*a,b* (e.g., using a 10 Gbps link) for internal communications between the management switch 207, 213 and the ToR switches 126*a,b*, 132*a,b*. Also in the illustrated example, the HMS 208, 214 is provided with in-band (IB) connectivity to individual server nodes (e.g., server nodes in example physical hardware resources 224, 226) of the physical rack 102, 104. In the illustrated example, the IB connection interfaces to physical hardware resources 224, 226 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 208, 214 include discovery of new hardware, bootstrapping, remote power control, authentication, hard resetting of non-responsive hosts, monitoring catastrophic hardware failures, and firmware upgrades. The example HMS 208, 214 uses IB management to periodically monitor status and health of the physical resources 224, 226 and to keep server objects and switch objects up to date. Example IB operations performed by the HMS 208, 214 include controlling power state, accessing temperature sensors, controlling Basic Input/Output System (BIOS) inventory of hardware (e.g., central processing units (CPUs), memory, disks, etc.), event monitoring, and logging events.

The HMSs 208, 214 of the corresponding physical racks 102, 104 interface with VRMs 225, 227 (e.g., software defined data center managers) of the corresponding physical racks 102, 104 to instantiate and manage the virtual server rack 206 using physical hardware resources 224, 226 (e.g., processors, pNICs, servers, switches, storage devices, peripherals, power supplies, etc.) of the physical racks 102, 104. In the illustrated example, the VRM 225 of the first physical rack 102 runs on a cluster of three server host nodes of the first physical rack 102, one of which is the server host node(0) 209. In the illustrated example, the VRM 227 of the second physical rack 104 runs on a cluster of three server host nodes of the second physical rack 104, one of which is the server host node(0) 211. In the illustrated example, the VRMs 225, 227 of the corresponding physical racks 102, 104 communicate with each other through the spine switches 142*a-d*. Also in the illustrated example, communications between physical hardware resources 224, 226 of the physical racks 102, 104 are exchanged between the ToR switches 126*a,b*, 132*a,b* of the physical racks 102, 104 through the spine switches 142*a-d*. In other examples, fewer or more spine switches 142*a-d* may be used. For example, additional spine switches may be added when physical racks are added to the virtual server rack 206.

The VRM 225 of the first physical rack 102 runs on a cluster of three server host nodes of the first physical rack 102 using a high availability (HA) mode configuration. In addition, the VRM 227 of the second physical rack 104 runs on a cluster of three server host nodes of the second physical rack 104 using the HA mode configuration. Using the HA mode in this manner, enables fault tolerant operation of the VRM 225, 227 in the event that one of the three server host nodes in the cluster for the VRM 225, 227 fails. Upon failure of a server host node executing the VRM 225, 227, the VRM 225, 227 can be restarted to execute on another one of the hosts in the cluster. Therefore, the VRM 225, 227 continues to be available even in the event of a failure of one of the server host nodes in the cluster.

In examples disclosed herein, a CLI and APIs are used to manage the ToR switches 126*a,b*, 132*a,b*. For example, the HMS 208, 214 uses CLI/APIs to populate switch objects corresponding to the ToR switches 126*a,b*, 132*a,b*. On HMS bootup, the HMS 208, 214 populates initial switch objects with statically available information. In addition, the HMS 208, 214 uses a periodic polling mechanism as part of an HMS switch management application thread to collect statistical and health data from the ToR switches 126*a,b*, 132*a,b* (e.g., Link states, Packet Stats, Availability, etc.). There is also a configuration buffer as part of the switch object which stores the configuration information to be applied on the switch.

The HMS 208, 214 of the illustrated example of FIG. 2 is a stateless software agent responsible for managing individual hardware resources in a physical rack 102, 104. Examples of hardware elements that the HMS 208, 214 manages are servers and network switches in the physical rack 102, 104. In the illustrated example, the HMS 208, 214 is implemented using Java on Linux so that an OOB management portion of the HMS 208, 214 runs as a Java application on a white box management switch (e.g., the management switch 207, 213) in the physical rack 102, 104. However, any other programming language and any other OS may be used to implement the HMS 208, 214.

Figure 3:
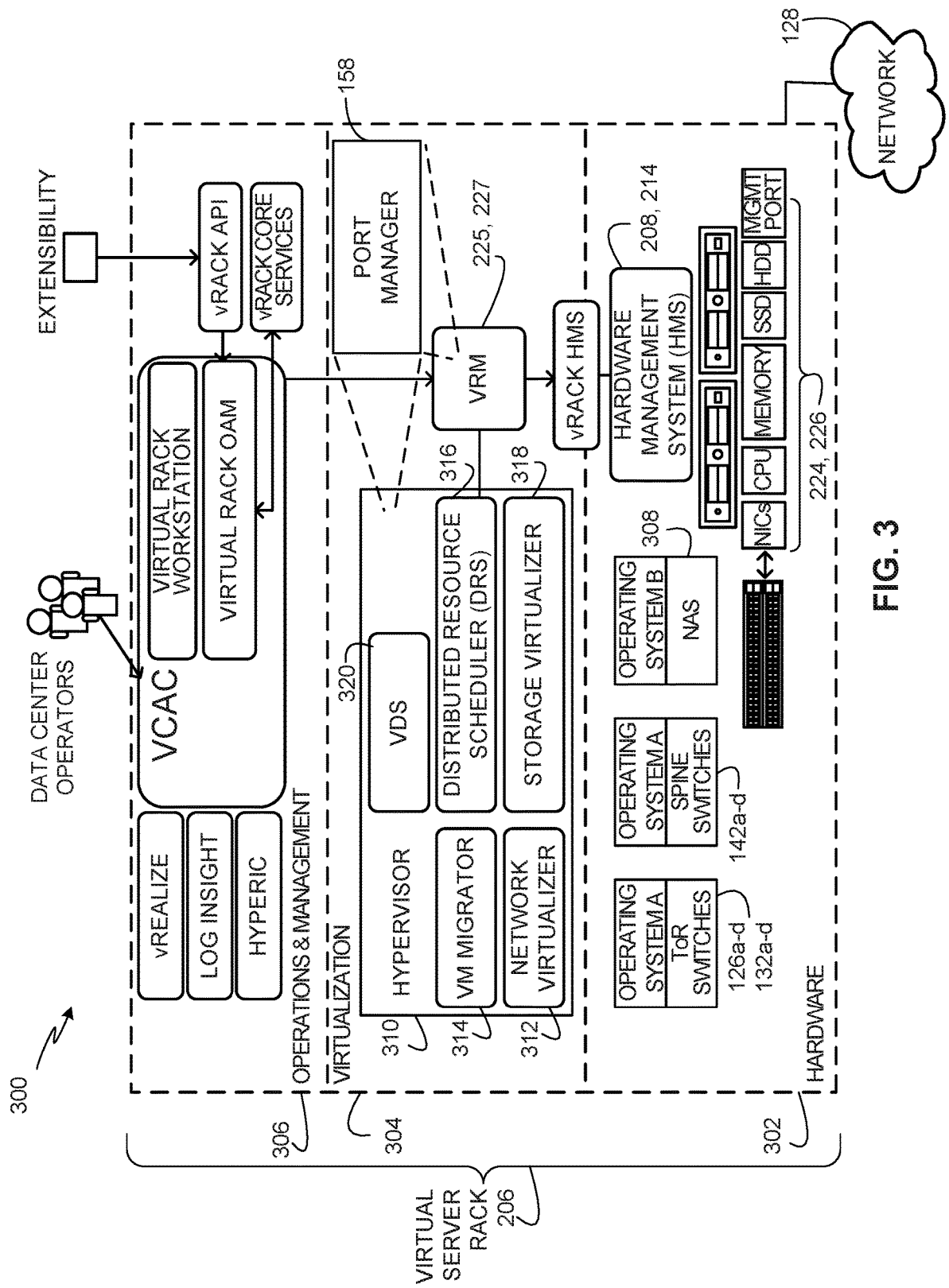
FIG. 3 depicts an example architecture to configure and deploy the example virtual server rack of FIG. 2 and to implement the example port manager of FIGS. 1A-1C in accordance with teachings of this disclosure.

FIG. 3 depicts an example virtual server rack architecture 300 that may be used to configure and deploy the virtual server rack 206 of FIG. 2 and to control network load balancing based on selection of the temporary source protocol ports 166 in accordance with teachings of this disclosure. The example architecture 300 of FIG. 3 includes a hardware layer 302, a virtualization layer 304, and an operations and management (OAM) layer 306. In the illustrated example, the hardware layer 302, the virtualization layer 304, and the OAM layer 306 are part of the example virtual server rack 206 of FIG. 2. The virtual server rack 206 of the illustrated example is based on the physical racks 102, 104 of FIGS. 1A-1C and 2. The example virtual server rack 206 configures the physical hardware resources 224, 226, virtualizes the physical hardware resources 224, 226 into virtual resources, provisions virtual resources for use in providing cloud-based services, and maintains the physical hardware resources 224, 226 and the virtual resources.

The example hardware layer 302 of FIG. 3 includes the HMS 208, 214 of FIG. 2 that interfaces with the physical hardware resources 224, 226 (e.g., processors, NICs, servers, switches, storage devices, peripherals, power supplies, etc.), the ToR switches 126a,b, 132a,b of FIGS. 1A, 1C and 2, the spine switches 142a-d of FIGS. 1A and 2, and network attached storage (NAS) hardware 308. The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208, 214 also supports rack-level boot-up sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 102, 104 including the dual-redundant management switches 207, 213 and dedicated management ports attached to the server host nodes(0) 209, 211 and the ToR switches 126a,b, 132a,b. In the illustrated example, one instance of the HMS 208, 214 runs per physical rack 102, 104. For example, the HMS 208, 214 may run on the management switch 207, 213 and the server host node(0) 209, 211 installed in the example physical rack 102 of FIGS. 1A and 2. In the illustrated example of FIG. 2 both of the HMSs 208, 214 are provided in corresponding management switches 207, 213 and the corresponding server host nodes (0) 209, 211 as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch 207, 213 and/or a failure of the server host nodes(0) 209, 211 on which the other HMS 208, 214 executes. In some examples, to achieve seamless failover, two instances of an HMS 208, 214 run in a single physical rack 102, 104. In such examples, the physical rack 102, 104 is provided with two management switches, and each of the two management switches runs a separate instance of the HMS 208, 214. In such examples, the physical rack 102 of FIGS. 1A and 2 runs two instances of the HMS 208 on two separate physical hardware management switches and two separate server host nodes(0), and the physical rack 104 of FIGS. 1A and 2 runs two instances of the HMS 214 on two separate physical hardware management switches and two separate server host nodes(0). In this manner, for example, one of the instances of the HMS 208 on the physical rack 102 serves as the primary HMS 208 and the other instance of the HMS 208 serves as the secondary HMS 208. The two instances of the HMS 208 on two separate management switches and two separate server host nodes(0) in the physical rack 102 (or the two instances of the HMS 214 on two separate management switches and two separate server host nodes(0) in the physical rack 104) are connected over a point-to-point, dedicated Ethernet link which carries heartbeats and memory state synchronization between the primary and secondary HMS instances.

The example virtualization layer 304 includes the VRM 225, 227. The example VRM 225, 227 communicates with the HMS 208, 214 to manage the physical hardware resources 224, 226. The example VRM 225, 227 creates the example virtual server rack 206 out of underlying physical hardware resources 224, 226 that may span one or more physical racks (or smaller units such as a hyper-appliance or half rack) and handles physical management of those resources. The example VRM 225, 227 uses the virtual server rack 206 as a basis of aggregation to create and provide operational views, handle fault domains, and scale to accommodate workload profiles. The example VRM 225, 227 keeps track of available capacity in the virtual server rack 206, maintains a view of a logical pool of virtual resources throughout the SDDC life-cycle, and translates logical resource provisioning to allocation of physical hardware resources 224, 226. The example VRM 225, 227 interfaces with an example hypervisor 310 of the virtualization layer 304. The example hypervisor 310 is installed and runs on server hosts in the example physical resources 224, 226 to enable the server hosts to be partitioned into multiple logical servers to create VMs. For example, the hypervisor 310 of FIG. 3 may be used to implement the hypervisor 110 of FIG. 1A to create the VM 114 of FIG. 1A in a virtual environment. In some examples, the hypervisor 310 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example, the VRM 225, 227 and/or the hypervisor 310 may be used to implement a virtual cloud management system such as an SDDC manager for a SDDC platform. An example virtual cloud management system that may be used with examples disclosed herein is the VMware Cloud Foundation (VCF) platform developed and provided by VMware, Inc. The virtual cloud management system implemented by the VRM 225, 227 and/or the hypervisor 310 manages different parameters of the ToR switches 126a,b, 132a,b, the spine switches 142a-d, and the NAS 308. In some examples, the virtual cloud management system commands different components even when such components run different OSs.

In the illustrated example of FIG. 3, the hypervisor 310 is shown having a number of virtualization components executing thereon including an example network virtualizer 312, an example VM migrator 314, an example distributed resource scheduler (DRS) 316, an example storage virtualizer 318, and an example VDS 320. In the illustrated example, the VRM 225, 227 communicates with these components to manage and present the logical view of underlying resources such as hosts and clusters. The example VRM 225, 227 also uses the logical view for orchestration and provisioning of workloads.

In some examples, the port manager 158 is implemented in the hypervisor 310. In other examples, the port manager 158 is implemented separate from the hypervisor 310. For example, the port manager 158 could alternatively be implemented in the VRM 225, 227 (e.g., a software defined data center manager). In some examples, the port manager 158 is implemented in both the hypervisor 310 and the VRM 225, 227. For example, separate instances of the port manager 158 may be implemented in both the hypervisor 310 and the VRM 225, 227 for redundancy and/or different aspects of the port manager 158 may be implemented across the hypervisor 310 and the VRM 225, 227. The example port manager 158 is described in more detail below in connection with FIG. 4.

The example network virtualizer 312 virtualizes network resources such as physical hardware switches (e.g., the management switches 207, 213 of FIG. 2, the ToR switches 126a,b, 132a,b, and/or the spine switches 14a-d) to provide software-based virtual networks. The example network virtualizer 312 enables treating physical network resources (e.g., switches) as a pool of transport capacity. In some examples, the network virtualizer 312 also provides network and security services to VMs with a policy driven approach. The network virtualizer 312 includes a number of components to deploy and manage virtualized network resources across servers, switches, and clients. For example, the network virtualizer 312 includes a network virtualization manager that functions as a centralized management component of the network virtualizer 312 and runs as a virtual appliance on a server host. In some examples, the network virtualizer 312 may be implemented using a VMWARE NSX™ network virtualization platform that includes a number of components including a VMWARE NSX™ network virtualization manager.

The example VM migrator 314 is provided to move or migrate VMs between different hosts without losing state during such migrations. For example, the VM migrator 314 allows moving an entire running VM from one physical server to another with substantially little or no downtime. The migrating VM retains its network identity and connections, which results in a substantially seamless migration process. The example VM migrator 314 enables transferring the VM's active memory and precise execution state over a high-speed network, which allows the VM to switch from running on a source server host to running on a destination server host.

The example DRS 316 is provided to monitor resource utilization across resource pools, to manage resource allocations to different VMs, to deploy additional storage capacity to VM clusters with substantially little or no service disruptions, and to work with the VM migrator 314 to automatically migrate VMs during maintenance with substantially little or no service disruptions.

The example storage virtualizer 318 is software-defined storage for use in connection with virtualized environments. The example storage virtualizer 318 clusters server-attached hard disk drives (HDDs) and solid state drives (SSDs) to create a shared datastore for use as virtual storage resources in virtual environments. In some examples, the storage virtualizer 318 may be implemented using a VMWARE® VIRTUAL SAN™ network data storage virtualization component developed and provided by VMware, Inc.

Figure 5:
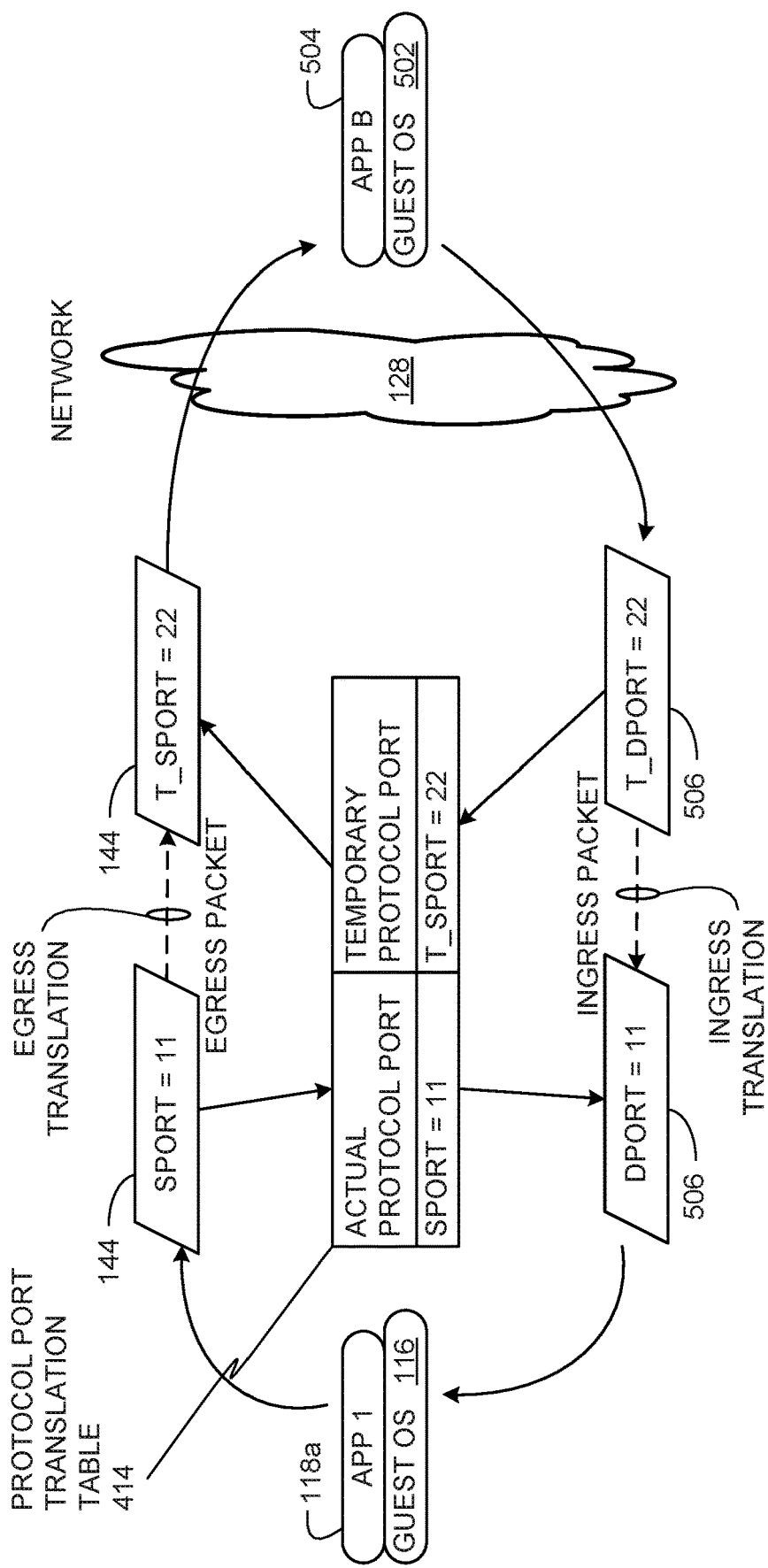
FIG. 5 depicts the example protocol port translation table of FIG. 4 in example protocol port replacement routines for egress and ingress network packets communicated between source and destination applications.

The example VDS 320 implements software-defined networks for use in connection with virtualized environments in the form of a networking module for the hypervisor 310. In some examples, the VDS 320 is distributed across multiple hosts and across separate hypervisors of those hosts (e.g., as shown in FIG. 5).

The virtualization layer 304 of the illustrated example, and its associated components are configured to run VMs. However, in other examples, the virtualization layer 304 may additionally, and/or alternatively, be configured to run containers. For example, the virtualization layer 304 may be used to deploy a VM as a data computer node with its own guest OS on a host using resources of the host. Additionally, and/or alternatively, the virtualization layer 304 may be used to deploy a container as a data computer node that runs on top of a host OS without the need for a hypervisor or separate OS.

In the illustrated example, the OAM layer 306 is an extension of a VMWARE VCLOUD® AUTOMATION CENTER™ (VCAC) that relies on the VCAC functionality and also leverages utilities such as VMWARE VCENTER™ Log Insight™, and VMWARE VCENTER™ HYPERIC® to deliver a single point of SDDC operations and management. The example OAM layer 306 is configured to provide different services such as health monitoring service, capacity planner service, maintenance planner service, events and operational view service, and virtual rack application workloads manager service.

Example components of FIG. 3 may be implemented using products developed and provided by VMware, Inc. Alternatively, some or all of such components may alternatively be supplied by components with the same and/or similar features developed and/or provided by other virtualization component developers.

Figure 4:
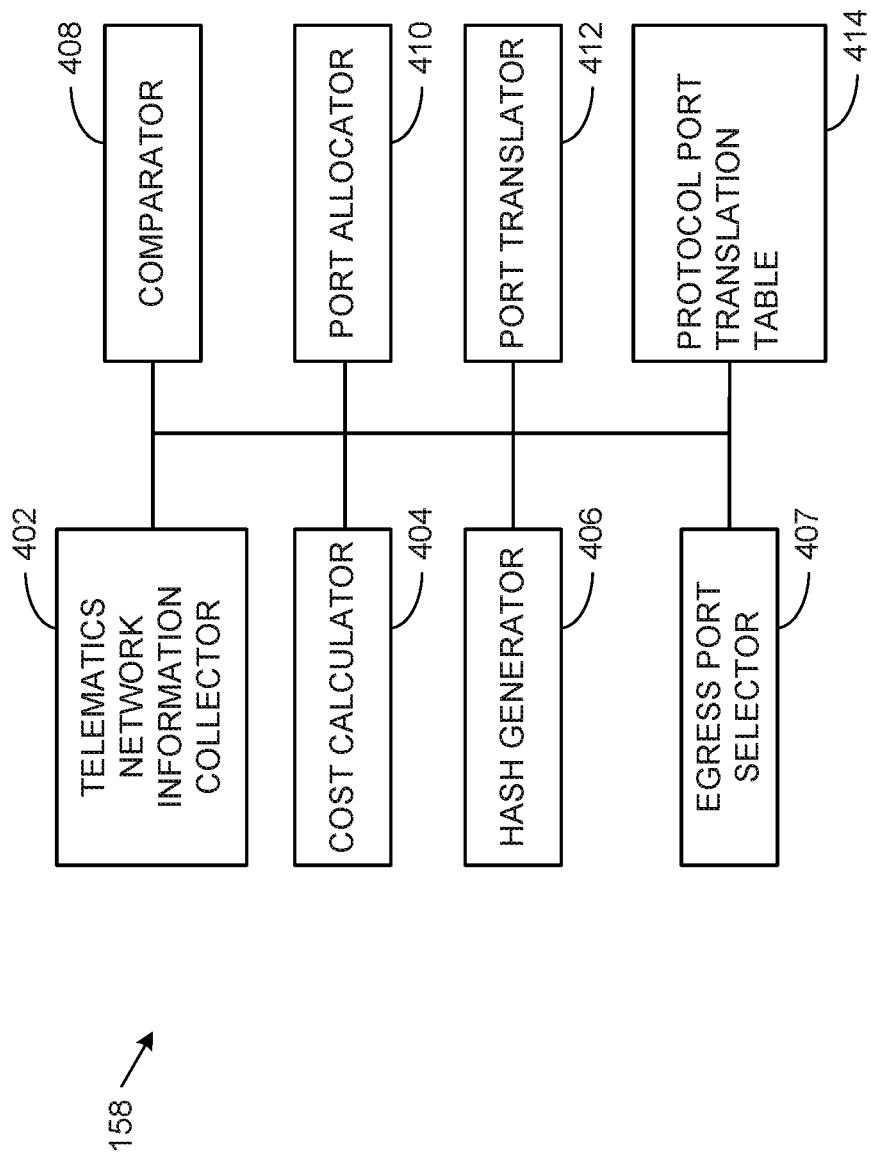
FIG. 4 depicts a block diagram of the example port manager of FIGS. 1A-1C and 3 that may be used to allocate temporary protocol ports to control network load balancing.

FIG. 4 depicts a block diagram of the example port manager 158 of FIGS. 1A-1C and 3 that may be used to allocate temporary source protocol ports to control network load balancing in accordance with teachings of this disclosure. The example port manager 158 includes an example telematics network information collector 402, an example cost calculator 404, an example hash generator 406, an example egress port selector 407, an example comparator 408, an example port allocator 410, an example port translator 412, and an example protocol port translation table 414. The example telematics network information collector 402 is provided to collect the telematics network information 168 of FIGS. 1B and 1C. For example, the telematics network information collector 402 may collect the telematics network information 168 from example telematics agents 706a-d running on different nodes as described below in connection with FIG. 7. The example port manager 158 is provided with the cost calculator 404 to calculate network path costs based on the telematics network information 168. For example, the cost calculator 404 accesses all available source protocol ports that can be assigned as a temporary source protocol port 166. Each source protocol port number will affect hashes calculated based on the load-balancing parameters 156. Thus, hash-based routing at each node between source and destination IP addresses will be different for the different source protocol port numbers. As such, at least some of the source protocol port numbers will result in different network paths between the source and destination IP addresses. To identify which available source protocol port yields the network path with the lowest bandwidth utilization so that it can be allocated as a temporary source protocol port 166, the cost calculator 404 calculates network path costs based on bandwidth utilization values in the telematics network information 174 for the different available source protocol ports.

The example port manager 158 is provided with the hash generator 406 to calculate hash values based on the load-balancing parameters 156 of FIGS. 1A-1C. For example, the port manager 158 may employ the hash generator 406 to generate hash values associated with hash-based routing for selecting egress ports corresponding to different nodes along a network path of a network packet.

The example port manager 158 is provided with the egress port selector 407 to select egress ports of switches (e.g., the egress ports 152, 154 of the first ToR switch 126a of FIG. 1A) in network paths based on the hash values. Bandwidth utilizations used by the cost calculator 404 to determine network path costs correspond to the egress ports selected by the egress port selector 407.

The example port manager 158 is provided with the comparator 408 to compare network path costs associated with different source protocol ports. For example, after the cost calculator 404 determines the network path costs for all source protocol ports available to assign as a temporary source protocol port 166, the comparator 408 compares the network path costs to determine a least network path cost. In some examples, the comparator 408 may sort the network path costs from largest to smallest to identify a source protocol port corresponding to a smallest network path cost in the sort list.

To allocate temporary source protocol ports, the example port manager 158 is provided with the port allocator 410. The example port allocator 410 determines available source protocol ports to allocate as the temporary source protocol ports 166 to packets (e.g., the network packets 144, 170 of FIGS. 1A and 1B) of applications (e.g., the applications 118a,b of FIGS. 1A and 1B). For example, to allocate a temporary source protocol port 166 to the application 118a, the port allocator 410 selects the source protocol port corresponding to a smallest network path cost identified by the comparator 408.

To modify actual source protocol ports of network packets (e.g., the network packets 144, 170) with the temporary source protocol ports 166, the example port manager 158 is provided with the port translator 412. The port translator 412 of the illustrated example accesses the temporary source protocol ports 166 selected by the port allocator 410, and modifies the load-balancing parameters 156 (FIGS. 1A-1C), of corresponding network packets to replace actual source protocol ports assigned by guest OSs (e.g., the guest OS 116) with the temporary source protocol ports 166. For example, when the port allocator 410 allocates a temporary source protocol port 166 to the application 118a, the port translator 412 replaces an actual source protocol port in the network packets 144 corresponding to the application 118a with the temporary source protocol port 166 so that the packets 144 will be routed along a network path through a network based on the temporary source protocol port 166 instead of the actual source protocol port assigned by a guest OS. In this manner, examples disclosed herein can load-balance network traffic in a network by analyzing the telematics network information collector 402 to analytically select temporary source protocol ports 166 to control hash-based routing of packets at nodes along a network path.

To store mappings of actual source protocol ports to temporary source protocol ports 166 for egress packets that are sent from the guest OS 116 to the network 128 of FIG. 1, the example port manager 158 is provided with the protocol port translation table 414. Referring to the example of FIG. 5, the protocol port translation table 414 shows a mapping between an actual protocol port (e.g., SPORT=11) and a temporary protocol port (e.g., T_SPORT=22). The actual protocol port (e.g., SPORT=11) is a source protocol port allocated by the guest OS 116 for the first application 118a. When the first application 118a sends a network packet 144, the first application 118a is a source application. The temporary protocol port (e.g., T_SPORT=22) is a temporary source protocol port 166 allocated by the port manager 158 of FIG. 4. When the example port manager 158 receives the network packet 144 from the guest OS 116, the network packet 144 is an egress packet that is outbound toward the network 128. The example port translator 412 uses the protocol port translation table 414 to store the temporary source protocol port 166 (e.g., T_SPORT=22) allocated by the port allocator 410 for the application 118a in association with the actual source protocol port (e.g., SPORT=11) allocated by the guest OS 116 for the application 118a. In addition, the example port translator 412 uses the protocol port translation table to perform an egress translation on the network packet 144 by replacing the actual protocol port (e.g., SPORT=11) with the temporary source protocol port 166 (e.g., T_SPORT=22) in the network packet 144.

The example port translator 412 also uses the protocol port translation table 414 to perform ingress translations by replacing destination protocol ports in ingress reply packets received from the network 128 and intended for delivery to the application 118a. In the example of FIG. 5, a guest OS 502 and a second application 504 are in a destination node that receives the packet 144 and use the temporary source protocol port 166 (e.g., T_SPORT=22) as a destination protocol port (e.g., T_DPORT=22) to send a reply packet 506 to the first application 118a. For the reply packet 506, the second application 504 is the source application, and the first application 118a is the destination application. For the guest OS 116 to deliver the ingress reply packet 506 correctly to the first application 118a, the port translator 412 uses the protocol port translation table 414 to perform an ingress translation by replacing the destination protocol port (e.g., T_DPORT=22) in the ingress reply packet 506 with the corresponding mapped actual source protocol port (e.g., SPORT=11) that was assigned by the guest OS 116 to the application 118a. However, for the ingress reply packet 506, the port translator 412 uses the actual source protocol port (e.g., SPORT=11) from the protocol port translation table 414 as the actual destination protocol port (e.g., DPORT=11) of the application 118a. In this manner, when the guest OS 116 receives the ingress reply packet 506 (e.g., from the network 128 of FIG. 1A), the guest OS 116 can deliver the ingress reply packet 506 to the application 118a based on the actual destination protocol port (e.g., DPORT=11) of the application 118a.

Figure 6:
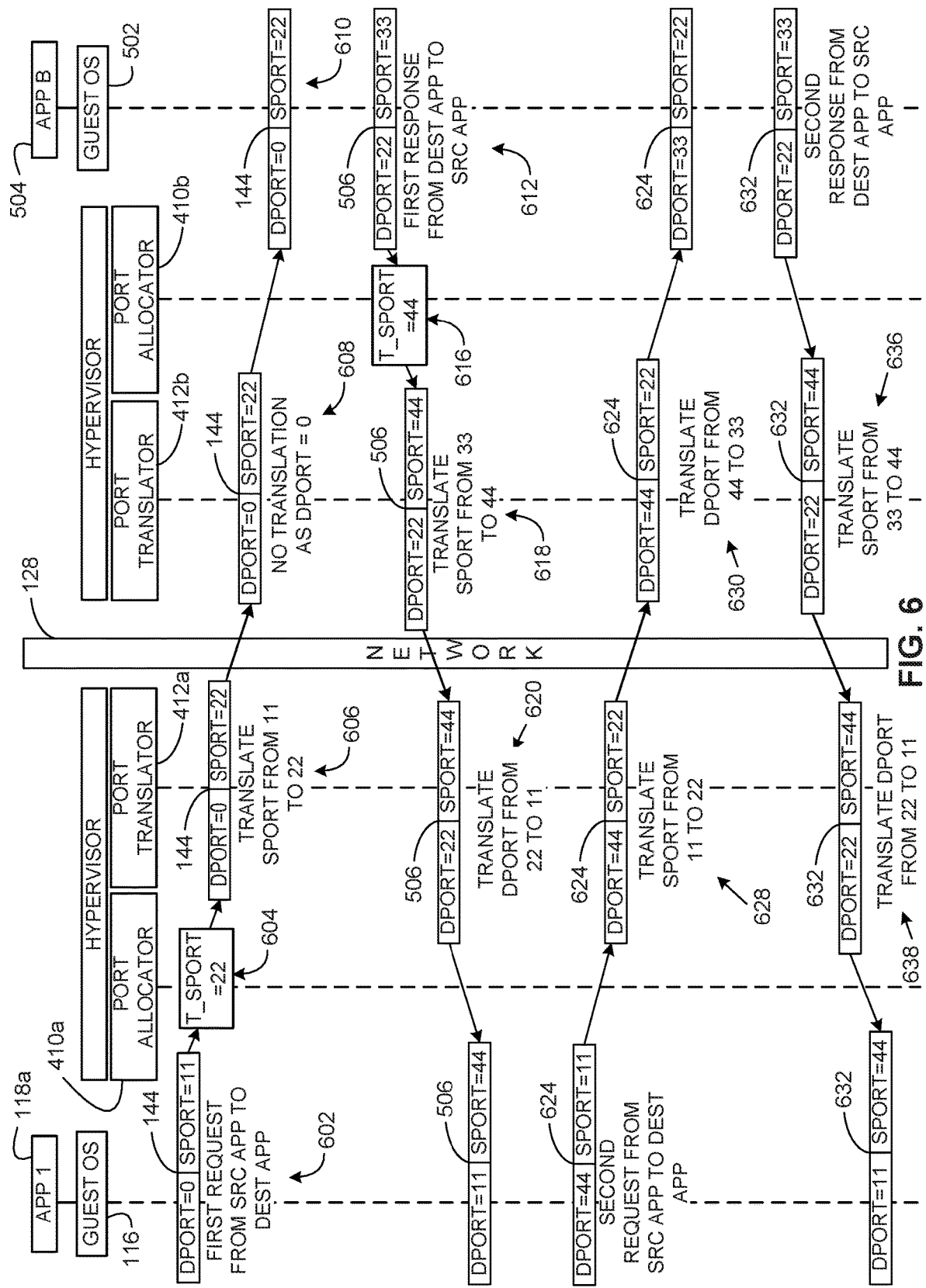
FIG. 6 is an example packet flow diagram showing how the example port allocator and the example port translator of FIG. 4 process egress and ingress packets between source and destination nodes.

FIG. 6 is an example packet flow diagram showing how the example port allocator 410 and the example port translator 412 of FIG. 4 process egress and ingress packets between source and destination nodes. In the illustrated example of FIG. 6, the first application 118a and the guest OS 116 execute in the first host 106a of the first physical rack 102 of FIG. 1A, and the guest OS 502 and the second application 504 execute in the first host 108a of the second physical rack 104 of FIG. 1A. An example port allocator 410a and an example port translator 412a process egress and ingress network packets between the guest OS 116 in the network 128. In the illustrated example of FIG. 6, the example port allocator 410a represents the example port allocator 410 (FIG. 4) of the port manager 158 (FIGS. 1A-1C, 3, and 4) that executes in the first host 106a of the first physical rack 102, and the example port translator 412a represents the example port translator 412 (FIG. 4) of the port manager 158. An example port allocator 410b and an example port translator 412b process ingress and egress network packets between the network 128 and the guest OS 502. The example port allocator 410b and the example port translator 412b are part of the example port manager 160 of FIG. 1A that executes in the first host 108a of the second physical rack 104.

Initially, the first application 118a generates the network packet 144. In the illustrated example, when the first application 118a sends the network packet 144, the first application 118a is a source application and the second application 504 is a destination application. At reference numeral 602, the guest OS 116 allocates an actual source port (e.g., SPORT=11) to the network packet 144, and sends the network packet 144 as a first request from the first application 118a to the second application 504. In the illustrated example, because the network packet 144 is a first request, the guest OS 116 allocates a destination port of zero (DPORT=0) to the network packet 144. The example network packet 144 is an egress packet because the network packet 144 is received at the port allocator 410a and the port translator 412a from the guest OS 116 to be sent to the network 128. At reference numeral 604, the example port allocator 410a allocates a temporary source protocol port 166 (FIGS. 1B and 1C) shown as "T_SPORT=22." At reference numeral 606, the example port translator 412a performs a translation of the source protocol port in the network packet 144 by replacing the actual source port (e.g., SPORT=11) with the temporary source protocol port 166 (e.g., T_SPORT=22) in the network packet 144. In addition, as described above in connection with FIG. 5, the port translator 412a stores the temporary source protocol port 166 (e.g., T_SPORT=22) in association with the actual source protocol port (e.g., SPORT=11) in the protocol port translation table 414. The network packet 144 is then sent through the network 128 toward the guest OS 502.

At reference numeral 608, the port translator 412b accesses the network packet 144 received via the network 128 and does not perform a translation of a destination port (DPORT) of the network packet 144 because the destination port is set to zero (e.g., DPORT=0). At reference numeral 610, the guest OS 502 receives the network packet 144 and identifies the source protocol port of the first application 118a as the temporary source protocol port 166 of 22 (e.g., SPORT=22). At reference numeral 612, the example guest OS 502 then processes a first response generated by the second application 504 for sending to the first application 118a as a reply network packet 506. In the illustrated example when the guest OS 502 sends the reply network packet 506, the second application 504 is a source application and the first application 118a is a destination application. In the illustrated example, because the reply network packet 506 is in response to the network packet 144, the guest OS 502 identifies the source protocol port (e.g., SPORT=22) of the network packet 144 as corresponding to the first application 118a. For any reply network packets from the guest OS 502 to the first application 118a, the guest OS 502 uses the source protocol port (e.g., SPORT=22) of the network packet 144 as a destination protocol port (DPORT) of the reply network packets. As such, the guest OS 502 sets the destination protocol port (e.g., DPORT=22) of the reply network packet 506 equal to the temporary source protocol port 166 of 22 (e.g., SPORT=22) located in the network packet 144. In the illustrated example, the guest OS 502 allocates an actual source protocol port of 33 (e.g., SPORT=33) to the reply network packet 506.

At reference numeral 616, the example port allocator 410b allocates a temporary source protocol port 166 (e.g., T_SPORT=44) for the second application 504. At reference numeral 618, the example port translator 412b performs a translation of the source protocol port in the reply network packet 506 by replacing the actual source port (e.g., SPORT=33) with the temporary source protocol port 166 (e.g., T_SPORT=44) in the reply network packet 506. The reply network packet 506 is then sent through the network 128 toward the guest OS 116.

At reference numeral 620, the port translator 412a accesses the reply network packet 506 received via the network 128 and performs a translation of the destination protocol port (e.g., DPORT=22) of the reply network packet 506. For example, the port translator 412a treats the destination protocol port (e.g., DPORT=22) of the reply network packet 506 as a temporary destination protocol port and uses the protocol port translation table 414 to identify that the temporary destination protocol port (e.g., DPORT=22) is mapped to the actual source protocol port (e.g., SPORT=11) of the first application 118a, as shown by way of example in FIG. 5. In the illustrated example, the port translator 412a uses the actual source protocol port (e.g., SPORT=11) in the protocol port translation table 414 as the actual destination protocol port (e.g., DPORT=11). The example port translator 412a performs a translation of the destination protocol port in the reply network packet 506 by replacing the temporary destination protocol port (e.g., DPORT=22) (which is set to the temporary source protocol port 166 allocated by the port allocator 410a at reference numeral 604) to the actual destination protocol port (e.g., DPORT=11) in the reply network packet 506. The reply network packet 506 is then forwarded to the guest OS 116 for delivery to the first application 118a.

In the illustrated example, the guest OS 116a sends a second request from the first application 118a (e.g., a source application) to the second application 504 (e.g., a destination application) as a network packet 624. For the second request, the guest OS 116 identifies the source protocol port (e.g., SPORT=44) of the reply network packet 506 as corresponding to the second application 504. For any subsequent requests sent from the guest OS 116 to the second application 504, the guest OS 116 uses the source protocol port (e.g., SPORT=44) of the reply network packet 506 as a destination protocol port (DPORT) of the subsequent request network packets. As such, the guest OS 116 sets the destination protocol port (e.g., DPORT=44) of the network packet 624 equal to the temporary source protocol port 166 of 44 (e.g., SPORT=44) located in the reply network packet 506. Also for the second request in the network packet 624, the port allocator 410a does not perform a new allocation of a temporary source protocol port 166 for the first application 118a because the port allocator 410a already performed such a temporary source protocol port allocation for the first application 118a in connection with the first request in the network packet 144 at reference numeral 604. Instead of performing another temporary source protocol port allocation, at reference numeral 628 the port translator 412a uses the protocol port translation table 414 to identify the temporary source protocol port 166 (e.g., T_SPORT=22) mapped to the actual source protocol port (e.g., SPORT=11), and performs a translation of the source protocol port in the network packet 624 by replacing the actual source protocol port (e.g., SPORT=11) with the temporary source protocol port 166 (e.g., T_SPORT=22) in the network packet 624. The network packet 624 is then sent through the network 128 toward the guest OS 502.

At reference numeral 630, the port translator 412b accesses the network packet 624 received via the network 128 and performs a translation of the destination protocol port (e.g., DPORT=44) of the network packet 624. For example, the port translator 412b treats the destination protocol port (e.g., DPORT=44) of the network packet 624 as a temporary destination protocol port and uses a protocol port translation table (e.g., similar to the protocol port translation table 414) to identify that the destination protocol port (e.g., DPORT=44) of the network packet 624 is mapped to the actual source protocol port (e.g., SPORT=33) of the second application 504. In the illustrated example, the port translator 412b uses the actual source protocol port (e.g., SPORT=33) in the protocol port translation table as the actual destination protocol port (e.g., DPORT=33). The example port translator 412b performs a translation of the destination protocol port in the network packet 624 by replacing the temporary destination protocol port (e.g., DPORT=44) (which is set to the temporary source protocol port 166 allocated by the port allocator 410b at reference numeral 616) to the actual destination protocol port (e.g., DPORT=33) in the network packet 624. The network packet 624 is then forwarded to the guest OS 502 for delivery to the second application 504.

The example guest OS 502 then generates a second response from the second application 504 to the first application 118a as a reply network packet 632. The guest OS 502 sets the destination protocol port (e.g., DPORT=22) of the reply network packet 632 equal to the temporary source protocol port 166 of 22 (e.g., SPORT=22) located in the network packet 624. The port allocator 410b does not perform a new allocation of a temporary source protocol port 166 for the second application 504 because the port allocator 410b already performed such a temporary source protocol port allocation for the second application 504 in connection with the first response in the reply network packet 506 at reference numeral 616. Instead of performing another temporary source protocol port allocation, at reference numeral 636 the port translator 412b uses a protocol port translation table (e.g., similar to the protocol port translation table 414) to identify the temporary source protocol port 166 (e.g., T_SPORT=44) mapped to the actual source protocol port (e.g., SPORT=33), and performs a translation of the source protocol port in the network packet 632 by replacing the actual source protocol port (e.g., SPORT=33) with the temporary source protocol port 166 (e.g., T_SPORT=44) in the network packet 632. The network packet 632 is then sent through the network 128 toward the guest OS 116.

At reference numeral 638, the port translator 412a accesses the network packet 632 received via the network 128 and performs a translation of the destination protocol port (e.g., DPORT=22) of the network packet 632. For example, the port translator 412a uses the protocol port translation table 414 to identify that the destination protocol port (e.g., DPORT=22) of the network packet 632 is mapped to the actual source protocol port (e.g., SPORT=11) of the first application 118a. The example port translator 412a performs a translation of the destination protocol port in the network packet 632 by replacing the destination protocol port (e.g., DPORT=22) (which is set to the temporary source protocol port 166 allocated by the port allocator 410a at reference numeral 604) to an actual destination protocol port (e.g., DPORT=11) in the network packet 632. The network packet 632 is then forwarded to the guest OS 116 for delivery to the first application 118a. The example flow diagram of FIG. 6 ends. However, the example processes of FIG. 6 can be repeated for subsequent network packets sent between the first application 118a and the second application 504 to control network load balancing by controlling how nodes between host 106a executing the guest OS 116 and the host 108a executing the guest OS 502 route network packets based on allocations of temporary source protocol ports 166.

Figure 7:
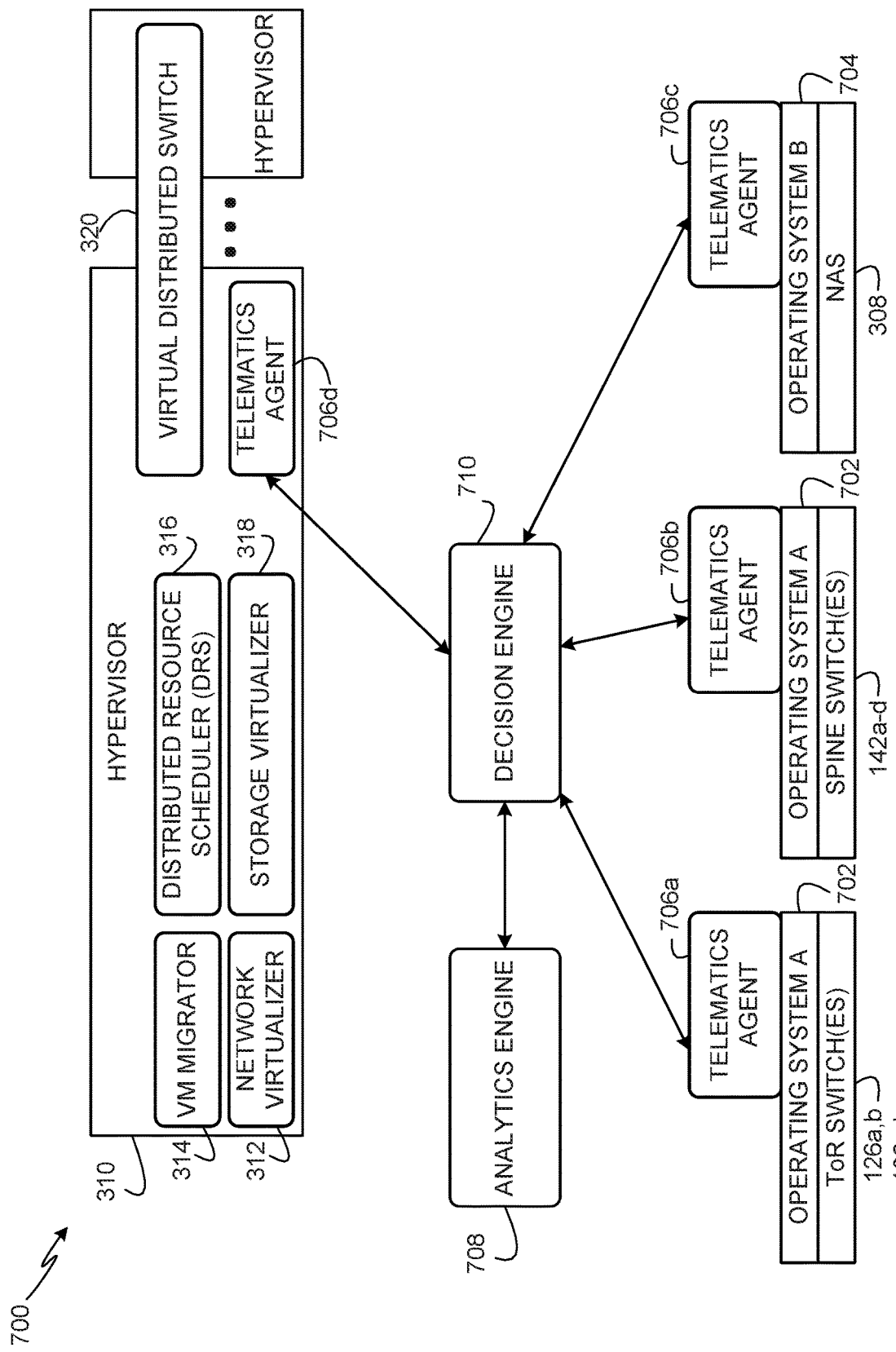
FIG. 7 depicts an example decision engine that uses telematics to collect telematics network information and allocates temporary protocol ports based on the telematics network information.

FIG. 7 depicts an example decision engine 710 that uses telematics to collect the telematics network information 168 (FIGS. 1B and 1C) and allocates the temporary source protocol ports 166 (FIGS. 1B and 1C) based on the telematics network information 168. The example decision engine 710 is in circuit with an example analytics engine 708 that is provided to analyze the telematics network information 168. In the illustrated example, the decision engine 710 and the analytics engine 708 are implemented by the example port manager 158 (FIGS. 1A-1C and 4). For example, the decision engine 710 may include the telematics network information collector 402, the port allocator 410, and the port translator 412 of FIG. 4; and the analytics engine 708 may include the cost calculator 404, the hash generator 406, the egress port selector 407, and the comparator 408 of FIG. 4.

The components illustrated in FIG. 7 represent an example virtual cloud management system 700 that includes the example network virtualizer 312, the example VM migrator 314, the example DRS 316, the example storage virtualizer 318, and the example VDS 320 of FIG. 3. In the illustrated example, the virtual cloud management system 700 is implemented using a SDDC deployment and management platform such as the VMware Cloud Foundation (VCF) platform developed and provided by VMware, Inc. The example virtual cloud management system 700 manages different parameters of the ToR switches 126a,b, 132a,b, the spine switches 142a-d, and the NAS 308. The example virtual cloud management system 700 commands different components even when such components run different OSs. For example, the ToR switches 126a,b, 132a,b and the spine switches 142a-d run OS A 702, and the NAS 308 runs OS B 704. In the illustrated example, the OS A 702 and the OS B 704 are different types of OSs. For example, the OS A 702 and the OS B 704 may be developed by different companies, may be developed for different hardware, maybe developed for different functionality, may include different kernels, and/or may be different in other ways. In some examples, the OS A 702 may be implemented using a Cisco NX-OS (developed and provided by Cisco Systems, Inc.) that can be run on leaf switches and/or spine switches, and the OS B 704 may be implemented using an EMC NAS OS (developed and provided by EMC Corporation) that runs on network attached storage devices. In the illustrated example of FIG. 7, the OS A 702 and the OS B 704 are unaware of the events occurring in the hypervisor 310. However, examples disclosed herein enable monitoring different OSs across physical resources at a system level to provide cooperative inter-OS and inter-resource management.

The example virtual cloud management system 700 includes example telematics agents 706a-d, the example analytics engine 708, and the example decision engine 710. In the illustrated example, the telematics agents 706a-d are provided to collect information from different hardware resources and provide the information to the example decision engine 710. In the illustrated example, the telematics agents 706a-d are provided as add-on modules installable and executable on the different components. For example, the telematics agent 706a is installed and executed on the OS A 702 of the ToR switches 126a,b, 132a,b, the example telematics agent 706b is installed and executed on the OS A 702 of the spine switches 142*a-d*, the example telematics agent 706*c* is installed and executed on the OS B 704 of the NAS 308, and the example telematics agent 706*d* is installed and executed on the hypervisor 310. In the illustrated example, the telematics agents 706*a-d* run on respective components while creating substantially little or no interference to the OSs of those components. For example, the telematics agents 706*a-d* may be implemented as a set of Access Control List (ACL) rules that operate as data collection rules to capture signatures of events that are happening in the virtual cloud management system 700. Such data collection rules can include static rules and/or dynamic rules. Example data collection rules can be used to collect statistics for various packet flows, to detect starts of VM migrations, to detect starts of virtualized storage rebalancing, to collect virtual extensible local area network (VXLAN) flow statistics, to collect L2 hop counts between various media access control (MAC) addresses, to collect QoS statistics, to collect maximum transmission unit (MTU) configurations, to collect equal-cost multi-path (ECMP) routing hash policies, to collect routing changes, etc. In the illustrated example, the example telematics agents 706*a-d* also collect bandwidth utilizations of different hops corresponding to different switches. For example, switches (e.g., the switches 126*a,b*, 132*a,b*, and 142*a-d* of FIG. 1A) have built-in algorithms to calculate network loads at their ports and corresponding physical network links. For example, if an egress port is capable of sending a maximum of 10 Gbps and the total of information transmitted on that port is 5 Gbps, the switch stores a network load measure of 50%. The example telematics agents 706*a-d* collect such information periodically as the telematics network information 168 (FIGS. 1B and 1C), and send the telematics network information 168 to the example decision engine 710 for analysis by the example analytics engine 708 and to identify subsequent responsive action based on such telematics network information 168.

In the illustrated example, the ACL of the telematics agents 706*a-d* are configured to detect probe packets from the example telematics network information collector 402 (FIG. 4) of the decision engine 710. In some examples, the ACL is configured with a unique source MAC address contained in the probe packets that can be used to determine if a probe passed through a network port. The telematics agents 706*a-d* respond by sending their telematics network information 168 to the telematics network information collector 402.

The example analytics engine 708 is provided to analyze the telematics network information 168 received from the telematics agents 706*a-d*, and the decision engine 710 allocates the temporary source protocol ports 166 (FIGS. 1B and 1C) based on such analyses. In some examples, the telematics network information 168 is low-level primitive data collected using packet sniffers in physical switches, and the analytics engine 708 is configured to identify high-level information such as bandwidth utilizations based on such low-level primitive data. For example, the example analytics engine 708 can perform big data analyses on the telematics network information 168 to determine egress ports (e.g., the egress ports 152 and 154 of FIG. 1A) having lower bandwidth utilizations.

While an example manner of implementing the port manager 158 of FIGS. 1A-1C, and/or FIG. 3 is illustrated in FIG. 4 and/or FIG. 7, one or more of the elements, processes and/or devices illustrated in FIG. 4 and/or FIG. 7 may be combined, divided, re-arranged, omitted, eliminated and/or implemented in any other way. Further, the example telematics network information collector 402 (FIG. 4), the example cost calculator 404 (FIG. 4), the example hash generator 406 (FIG. 4), the egress port selector 407 (FIG. 4), the example comparator 408 (FIG. 4), the example port allocator 410 (FIG. 4), the example port translator 412 (FIG. 4), and the example protocol port translation table 414 (FIG. 4), the example analytics engine 708 (FIG. 7), the example decision engine 710 (FIG. 7), and/or, more generally, the example port manager 158 of FIGS. 1A-1C, FIG. 3, and/or FIG. 4 may be implemented by hardware, software, firmware and/or any combination of hardware, software and/or firmware. Thus, for example, any of the example telematics network information collector 402, the example cost calculator 404, the example hash generator 406, the egress port selector 407, the example comparator 408, the example port allocator 410, the example port translator 412, the example protocol port translation table 414, the example analytics engine 708, and the example decision engine 710 and/or, more generally, the example port manager 158 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example telematics network information collector 402, the example cost calculator 404, the example hash generator 406, the egress port selector 407, the example comparator 408, the example port allocator 410, the example port translator 412, the example protocol port translation table 414, the example analytics engine 708, and/or the example decision engine 710 is/are hereby expressly defined to include a non-transitory computer readable storage device or storage disk such as a memory, a digital versatile disk (DVD), a compact disk (CD), a Blu-ray disk, etc. including the software and/or firmware. Further still, the example port manager 158 of FIGS. 1A-1C, FIG. 3, and/or FIG. 4 may include one or more elements, processes and/or devices in addition to, or instead of, those illustrated in FIG. 4 and FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples disclosed herein, means for collecting bandwidth utilizations is implemented by the telematics network information collector 402 (FIG. 4). In some examples disclosed herein, means for determining network path costs is implemented by the cost calculator 404 (FIG. 4). In some examples disclosed herein, means for comparing network path costs is implemented by the comparator 408 (FIG. 4). In some examples disclosed herein, means for allocating one of the unused protocol ports is implemented by the port allocator 410 (FIG. 4). In some examples disclosed herein, means for generating hash values is implemented by the hash generator 406 (FIG. 4). In some examples disclosed herein, means for selecting egress ports is implemented by the egress port selector 407 (FIG. 4). In some examples disclosed herein, means for translating ports is implemented by the port translator 412 (FIG. 4). In some examples disclosed herein, means for storing actual protocol ports in association with corresponding temporary protocol ports is implemented by the protocol port translation table 414 (FIG. 4).

Flowcharts representative of example hardware logic or machine-readable instructions for implementing the port manager 158 of FIGS. 1A-1C, FIG. 3, and/or FIG. 4 are shown in FIGS. 8, 9A-9C, and 10-15. The machine-readable instructions may be one or more programs or portions of one or more programs for execution by a processor such as the processor 1612 shown in the example processor platform 1600 discussed below in connection with FIG. 16. The programs may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example programs are described with reference to the flowcharts illustrated in FIGS. 8, 9A-9C, and 10-15, many other methods of implementing the example port manager 158 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 8, 9A-9C, and 10-15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 8:
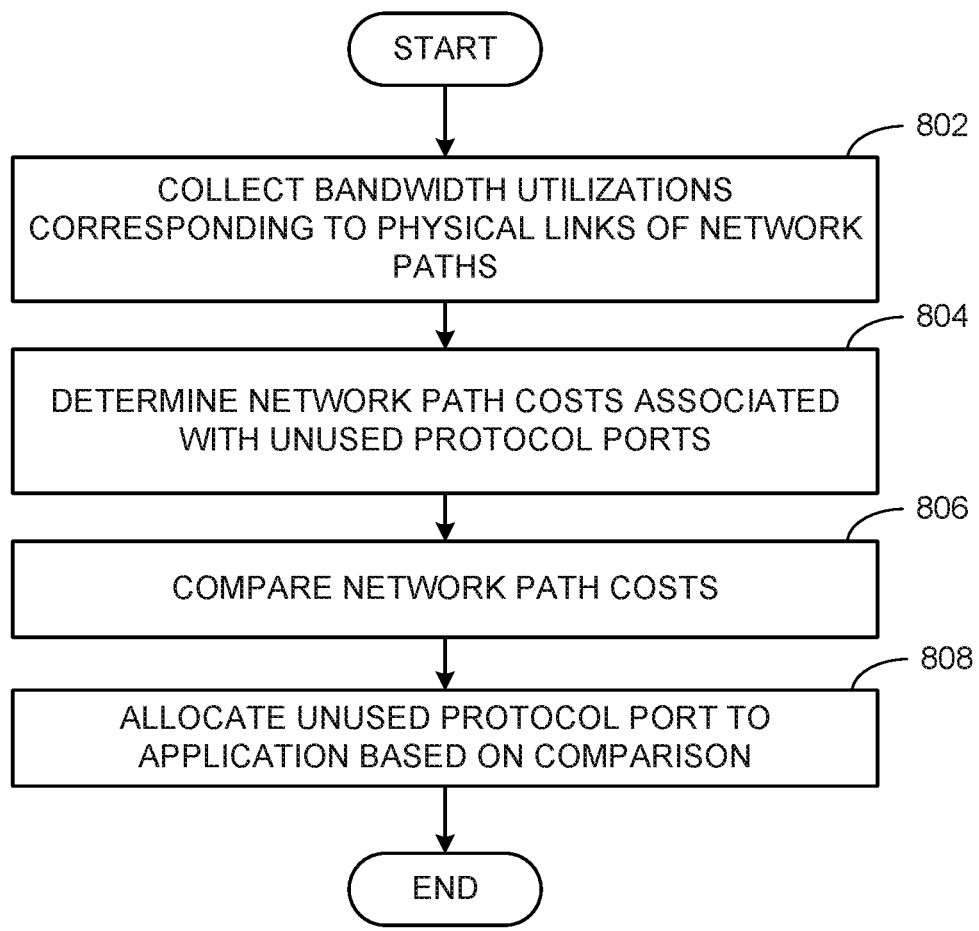
FIG. 8 is a flowchart representative of example machine readable instructions that may be executed to implement the port manager of FIGS. 1A-1C, FIG. 3, and/or FIG. 4 to allocate temporary protocol ports to applications to control network load balancing.

FIG. 8 is a flowchart representative of example machine readable instructions that may be executed to implement the port manager 158 of FIGS. 1A-1C, FIG. 3, and/or FIG. 4 to allocate temporary source protocol ports 166 (FIGS. 1B and 1C) to applications (e.g., the application 118a of FIGS. 1A, 1B, 5, and 6) to control network load balancing. The example program of FIG. 8 begins at block 802 at which the telematics network information collector 402 (FIG. 4) collects bandwidth utilizations corresponding to physical links of network paths between a source and a destination. For example, the telematics network information collector 402 communicates with the 706a-d (FIG. 7) to collect the telematics network information 168 corresponding to egress ports (e.g., the egress ports 152 and 154 of FIG. 1A) of nodes (e.g., switches) along network paths between source IP address and a destination IP address of the network packet 144 (FIGS. 1A, 1B, 5, and 6). In the illustrated example, the network paths include at least one of a LAG hop (e.g., the LAG 146 and/or the LAG 148 of FIG. 1A) or an ECMP hop (e.g., one or more ECMP hops formed by the ECMP links 150 of FIG. 1A).

The example cost calculator 404 (FIG. 4) determines network path costs corresponding to unused protocol ports of a physical server host (block 804). For example, for a number of unused protocol ports of the host 106a (FIG. 1A), the cost calculator 404 determines corresponding network path costs between the source IP address and the destination IP address of the network packet 144 based on the bandwidth utilizations collected at block 802 in the telematics network information 168.

The example comparator 408 (FIG. 4) compares the network path costs (block 806). For example, the comparator 408 compares the network path costs to determine a least network path cost. In some examples, the comparator 408 may sort the network path costs from largest to smallest. Based on the comparison, the example port allocator 410 (FIG. 4) allocates one of the unused protocol ports to the application 118a (block 808). For example, the port allocator 410 can select and allocate one of the unused protocol ports that corresponds to the least network path cost identified by the comparator 408. In some examples, the port allocator 410 selects and allocates one of the unused protocol ports corresponding to the smallest network path cost in a largest to smallest sort list generated by the comparator 408. In any case, the port allocator 410 allocates the one of the unused protocol ports as a temporary source protocol port 166. The example process of FIG. 8 then ends.

Figure 9A:
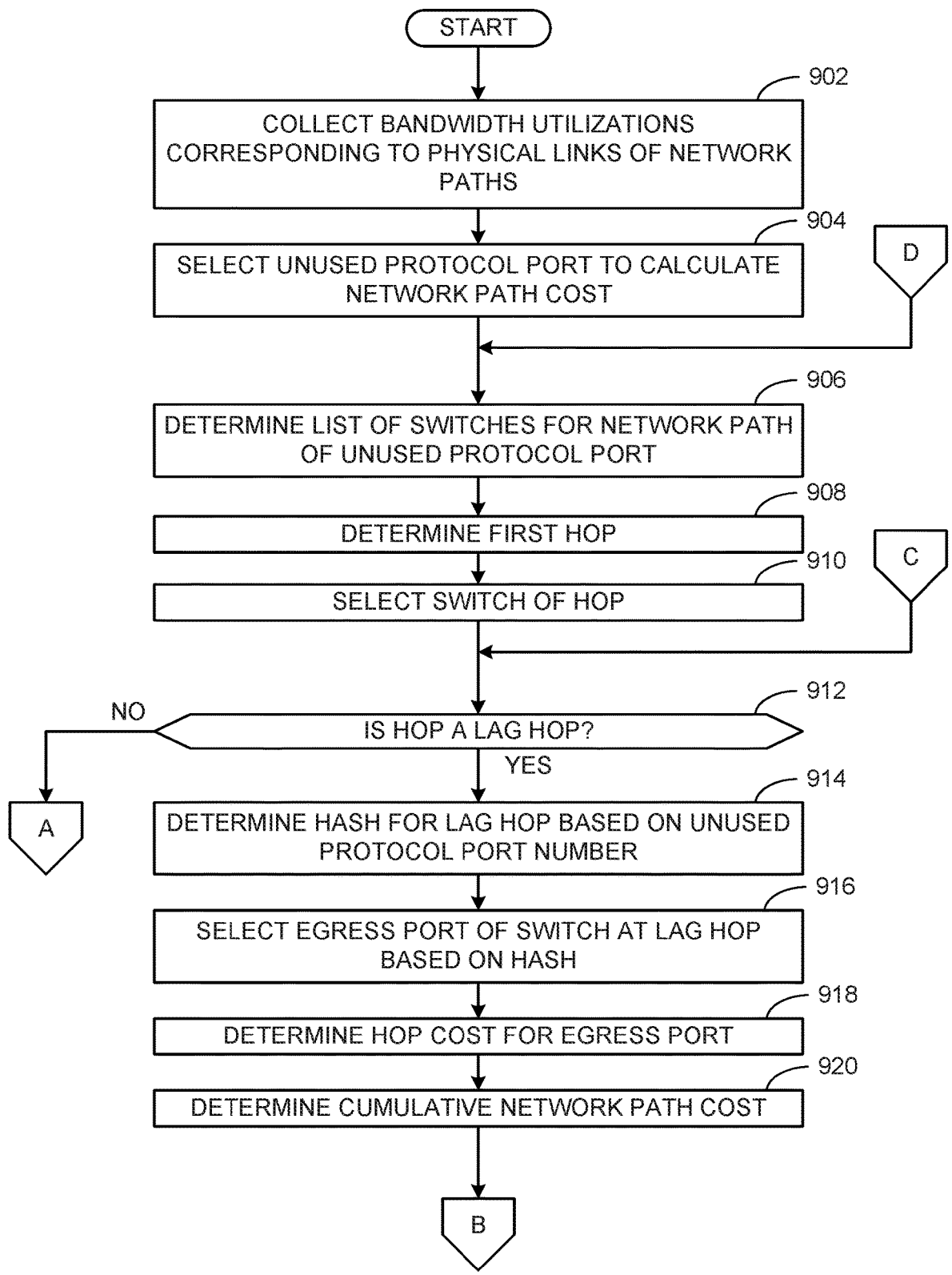
FIGS. 9A-9C depict another flowchart representative of example machine readable instructions that may be executed to implement the port manager of FIGS. 1A-1C, FIG. 3, and/or FIG. 4 to allocate temporary protocol ports to applications to control network load balancing.
Figure 9B:
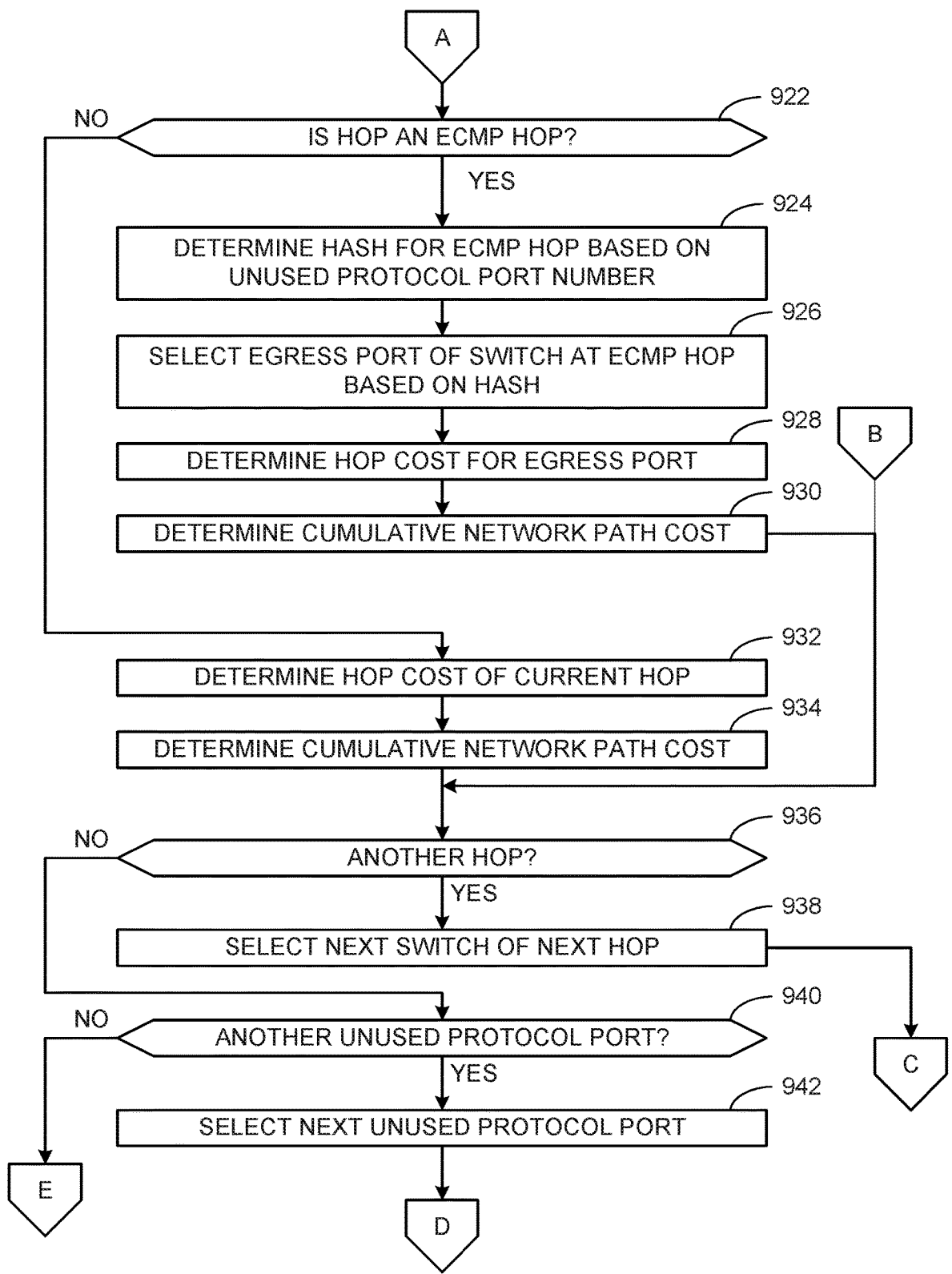
Figure 9C:
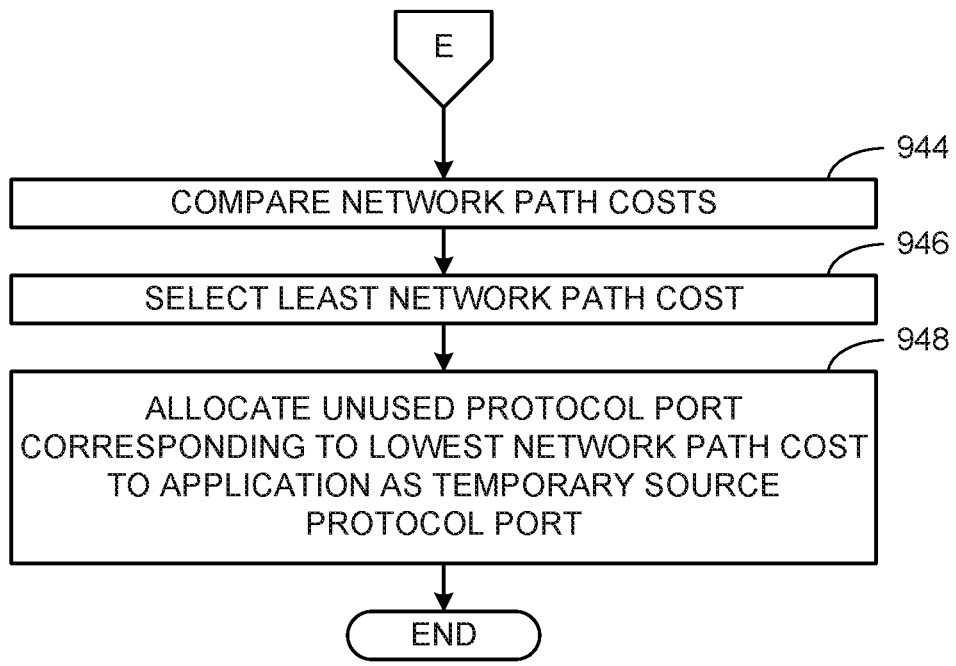

FIGS. 9A-9C depict another flowchart representative of example machine readable instructions that may be executed to implement the port manager 158 of FIGS. 1A-1C, FIG. 3, and/or FIG. 4 to allocate temporary source protocol ports 166 (FIGS. 1B and 1C) to applications (e.g., the application 118a of FIGS. 1A, 1B, 5, and 6) to control network load balancing. The example process of FIGS. 9A-9C begins at block 902 (FIG. 9A) at which the telematics network information collector 402 (FIG. 4) collects bandwidth utilizations corresponding to physical links of network paths between a source and a destination. For example, the telematics network information collector 402 communicates with the 706a-d (FIG. 7) to collect the telematics network information 168 corresponding to egress ports (e.g., the egress ports 152 and 154 of FIG. 1A) of nodes (e.g., switches) along network paths between source IP address and a destination IP address of the network packet 144 (FIGS. 1A, 1B, 5, and 6). In the illustrated example, the network paths include at least one of a LAG hop (e.g., the LAG 146 and/or the LAG 148 of FIG. 1A) or an ECMP hop (e.g., one or more ECMP hops formed by the ECMP links 150 of FIG. 1A).

The example port allocator 410 (FIG. 4) selects an unused protocol port of the host 106a (FIG. 1A) to calculate a network path cost (block 904). For example, the port allocator 410 may identify a plurality of unused protocol ports of the host 106*a* that are available for allocating as temporary source protocol ports 166. To identify one of the unused protocol ports having a least network path cost between a source IP address and a destination IP address of the network packet 144, the port manager 158 calculates a network path cost for each of the available unused protocol ports. The operation of block 904 is used to identify a current one of the unused protocol ports for which the port manager 158 will calculate a network path cost. The example port allocator 410 determines a list of switches (e.g., the switches 126*a,b*, 142*a-d*, and 132*a,b* of FIG. 1A) in the network path corresponding to the current unused protocol port (block 906). For example, the port allocator 410 may analyze the telematics network information 168 to determine a list of switches that connect the current unused protocol port to the destination IP address of the network packet 144. The example port allocator 410 determines a first hop (block 908) in the network path corresponding to the current unused protocol port. The example port allocator 410 selects a switch of the hop (block 910). For example, if the first hop is the lag 146 (FIG. 1A) or the ECMP links 150 (FIG. 1A), the port allocator 410 selects the first ToR switch 126*a* (FIG. 1A).

The example port allocator 410 determines whether the hop is a LAG hop (block 912). For example, the port allocator 410 may analyze the telematics network information 168 switch information indicative of which switches include LAGs. When the example port allocator 410 determines at block 912 that the hop is a LAG hop, the hash generator 406 (FIG. 4) determines a hash for the LAG hop based on the current unused protocol port number (block 914). The example egress port selector 407 (FIG. 4) selects an egress port of the switch at the LAG hop based on the hash (block 916). For example, the egress port selector 407 may compare a modulus of the hash to modulus values assigned to each of the egress ports of the switch to identify which of the egress ports is to be used for the network path corresponding to the current unused source protocol port. The example cost calculator 404 (FIG. 4) determines a hop cost for the egress port (block 918). For example, the cost calculator 404 may access the telematics network information 168 to retrieve a bandwidth utilization corresponding to the egress port at the current hop. In the illustrated example, the cost calculator 404 determines the hop cost by dividing a current bandwidth utilization of the egress port by the total capable speed of the egress port, and multiplying the resulting quotient by 100 (e.g., hop cost=(current utilization of egress port/total capable speed of egress port)*100). The example cost calculator 404 determines a cumulative network path cost for the current unused source protocol port (block 920). For example, after the cost calculator 404 determines two or more hop costs for different egress ports along a network path corresponding to the unused source protocol port, the cost calculator 404 adds the hop costs to determine a cumulative network path cost. When the cost calculator 404 determines a next hop cost at block 918, the cost calculator 404 adds the next hop cost to the previously cumulated network path cost at block 920 to determine a current cumulative network path cost.

Referring again to block 912, when the example port allocator 410 determines that the hop is not a LAG hop, control advances to block 922 (FIG. 9B). At block 922, the example port allocator 410 determines whether the hop is an ECMP hop. For example, the port allocator 410 may analyze the telematics network information 168 switch information indicative of which switches include ECMP links. When the example port allocator 410 determines at block 922 that the hop is an ECMP hop, the hash generator 406 determines a hash for the ECMP hop based on the current unused protocol port number (block 924). The example egress port selector 407 determines an egress port of the switch at the ECMP hop based on the hash (block 926). For example, the egress port selector 407 may compare a modulus of the hash to modulus values assigned to each of the egress ports of the switch to identify which of the egress ports is to be used for the network path corresponding to the current unused source protocol port. The example cost calculator 404 determines a hop cost for the egress port (block 928). For example, the cost calculator 404 may access the telematics network information 168 to retrieve a bandwidth utilization corresponding to the egress port at the current hop. In the illustrated example, the cost calculator 404 determines the hop cost by dividing a current bandwidth utilization of the egress port by the total capable speed of the egress port, and multiplying the resulting quotient by 100 (e.g., hop cost=(current utilization of egress port/total capable speed of egress port)*100). The example cost calculator 404 determines a cumulative network path cost for the current unused source protocol port (block 930). For example, after the cost calculator 404 determines two or more hop costs for different egress ports along a network path corresponding to the unused source protocol port, the cost calculator 404 adds the hop costs to determine a cumulative network path cost. When the cost calculator 404 determines a next hop cost at block 928, the cost calculator 404 adds the next hop cost to the previously cumulated network path cost at block 930 to determine a current cumulative network path cost.

Referring again to block 922, when the example port allocator 410 determines that the hop is not an ECMP hop, control advances to block 932. At block 932, the cost calculator 404 determines a hop cost of a current hop (block 932). In the illustrated example, when the current hop is not a LAG hop and not an ECMP hop, the hop is a link connected to a single egress port of a switch. As such, the hop cost is the bandwidth utilization of that egress port that the cost calculator 404 obtains from the telematics network information 168. In the illustrated example, the cost calculator 404 determines the hop cost by dividing a current bandwidth utilization of the egress port by the total capable speed of the egress port, and multiplying the resulting quotient by 100 (e.g., hop cost=(current utilization of egress port/total capable speed of egress port)*100). The example cost calculator 404 determines a cumulative network path cost for the current unused source protocol port (block 934). For example, the cost calculator 404 adds the current hop cost determined at block 932 to any previous cumulative network path cost determined by performing the operations of blocks 914, 916, 918, 920 for LAG hop(s), the operations of blocks 924, 926, 928, 930 for ECMP hop(s), and/or the operation of block 932 for hops that are not LAG hops or ECMP hops.

At block 936, the example port allocator 410 determines whether there is another hop to analyze. For example, the port allocator 410 may analyze the list of switches for the network path determined at block 906 to determine whether there is another hop in the network path cost corresponding to the current unused source protocol port. When there is another hop to analyze, the port allocator 410 selects the next switch of the next hop (block 938), and control returns to block 912 of FIG. 9A. When the example port allocator 410 determines at block 936 that there is not another hop, control advances to block 940. At block 940, the example port allocator 410 determines whether there is another unused protocol port to analyze (block 940). For example, the port allocator 410 may determine whether there is another unused protocol port of the host 106a for which to generate a network path cost. When the port allocator 410 determines at block 940 that there is another unused protocol port for which to determine a network path cost, the port allocator 410 selects the next unused protocol port (block 942), and control returns to block 906 (FIG. 9A).

When the port allocator 410 determines at block 940 that there is not another unused protocol port, control advances to block 944 (FIG. 9C). At block 944, the example comparator 408 (FIG. 4) compares the network path costs. For example, the comparator 408 compares the network path costs of all of the unused protocol ports for which network path costs were determined. The comparator 408 uses the comparison to determine a least network path cost. In some examples, the comparator 408 may sort the network path costs from largest to smallest. The example port allocator 410 selects a least network path cost (block 946). For example, the port allocator 410 can select one of the unused protocol ports that corresponds to the least network path cost identified by the comparator 408. In some examples, the port allocator 410 selects one of the unused protocol ports corresponding to the smallest network path cost in a largest to smallest sort list generated by the comparator 408.

The example port allocator 410 allocates the unused protocol port corresponding to the least network path cost to the application 118a as a temporary source protocol port 166 (block 948). In this manner, temporary source protocol port 166 can be used to send the network packet 144 to a destination IP address via the network 128 (FIGS. 1A, 3, 5, and 6). The example process of FIG. 9 then ends.

Figure 10:
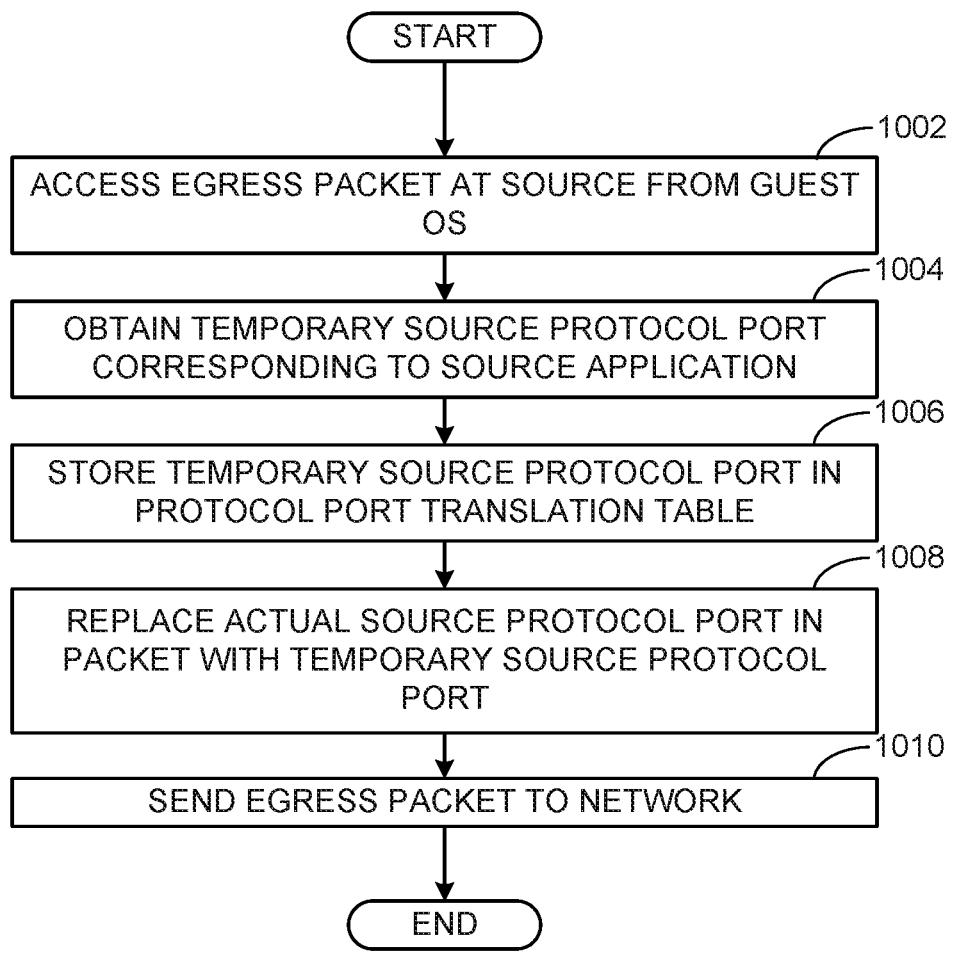
FIG. 10 is a flowchart representative of example machine readable instructions that may be executed to implement the port manager of FIGS. 1A-1C, FIG. 3, and/or FIG. 4 to translate temporary protocol ports of egress packets received from a guest operating system (OS) for sending to a network.

FIG. 10 is a flowchart representative of example machine readable instructions that may be executed to implement the port manager 158 of FIGS. 1A-1C, FIG. 3, and/or FIG. 4 to translate temporary source protocol ports 166 (FIGS. 1B and 1C) of egress packets (e.g., the network packet 144 of FIGS. 1A, 1B, 5, and 6) received from a guest OS (e.g., the guest OS 116 of FIGS. 1A, 5, and 6) for sending to a network (e.g., the network 128 of FIGS. 1A, 3, 5, and 6). The example program of FIG. 10 begins at block 1002 at which the example port translator 412 (FIG. 4) accesses the network packet 144 at the source node from the guest OS 116 as an egress packet. In the illustrated example of FIG. 10, the host 106a (FIGS. 1A and 1B) is the source node because it is sending the network packet 144. The example port translator 412 obtains the temporary source protocol port 166 corresponding to the source application (block 1004). For example, the port translator 412 obtains the temporary source protocol port 166 allocated by the port allocator 410 for the application 118a in connection with the example process of FIG. 8 and/or the example process of FIGS. 9A-9C. The example port translator 412 stores the temporary source protocol port 166 in the example protocol port translation table 414 of FIGS. 4 and 5 (block 1006). The example port translator 412 replaces an actual source protocol port in the network packet 144 with the temporary source protocol port 166 (block 1008). The source node (e.g., the host 106a) sends the network packet 144 to the network 128 (block 1010). The example process of FIG. 10 then ends.

Figure 11:
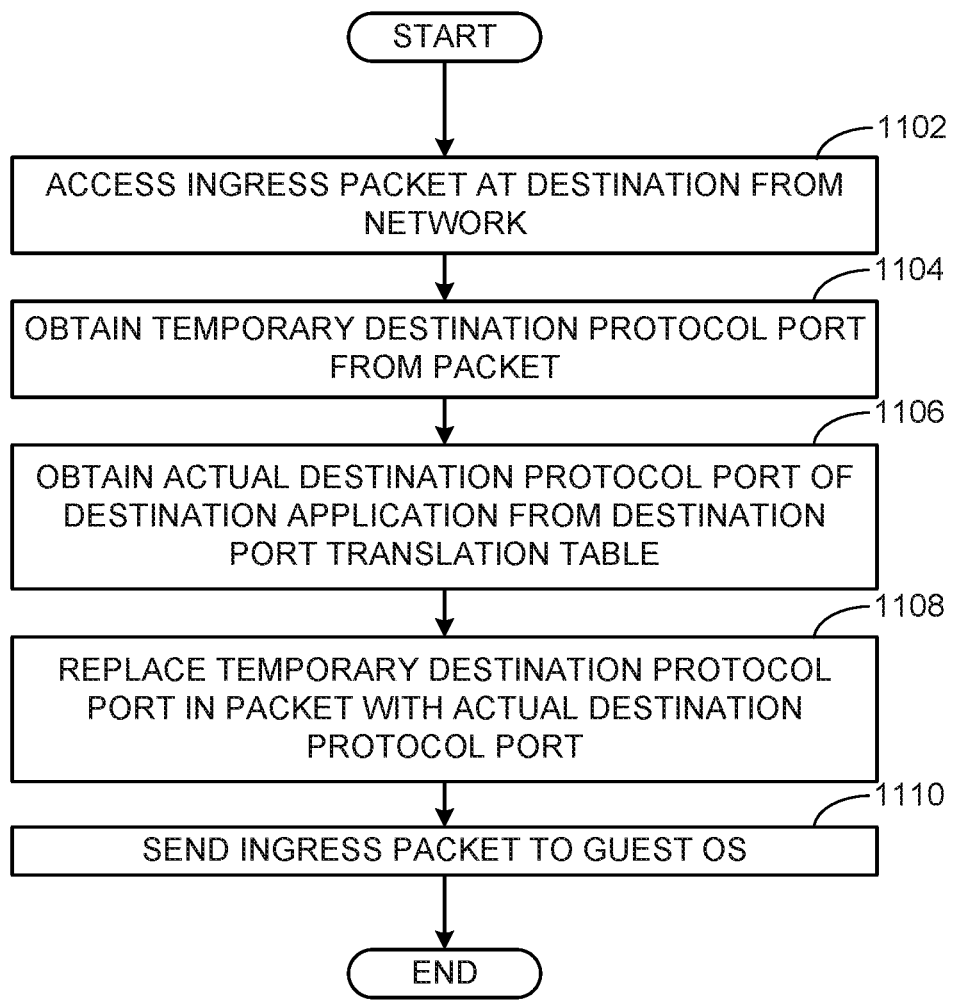
FIG. 11 is a flowchart representative of example machine readable instructions that may be executed to implement the port manager of FIGS. 1A-1C, FIG. 3, and/or FIG. 4 to translate temporary protocol ports of ingress packets received from a network for delivery to a guest OS.

FIG. 11 is a flowchart representative of example machine readable instructions that may be executed to implement the port manager 158 of FIGS. 1A-1C, FIG. 3, and/or FIG. 4 to translate temporary source protocol ports 166 (FIGS. 1B and 1C) of ingress packets (e.g., the reply network packet 506 of FIGS. 5 and 6) received from a network (e.g., the network 128 of FIGS. 1A, 3, 5, and 6) for delivery to a guest OS (e.g., the guest OS 116 of FIGS. 1A, 5, and 6). The example program of FIG. 11 begins at block 1102 at which the example port translator 412 (FIG. 4) accesses the reply network packet 506 at the destination node from the guest OS 116 as an ingress packet. In the illustrated example of FIG. 11, the host 106a (FIGS. 1A and 1B) is the destination node because it is receiving the reply network packet 506. The example port translator 412 obtains a temporary destination protocol port from the reply network packet 506 (block 1104). In the illustrated example, the temporary destination protocol port of the reply network packet 506 is equal to the temporary source protocol port 166 in a request network packet (e.g., the network packet 144) to which the reply network packet 506 is responding. The example port translator 412 obtains the actual destination protocol port from the example protocol port translation table 414 (FIGS. 4 and 5) based on the temporary destination protocol port (block 1106). In the illustrated example, the actual destination protocol port of the destination application 118a is the actual source protocol port allocated by the guest OS 116 in the request network packet (e.g., the network packet 144) to which the reply network packet 506 is responding. The example port translator 412 replaces the temporary destination protocol port in the reply network packet 506 with the actual destination protocol port (block 1108). The network stack 120 (FIG. 1) sends the reply network packet 506 to the guest OS 116 (block 1110). The example process of FIG. 11 then ends.

Figure 12:
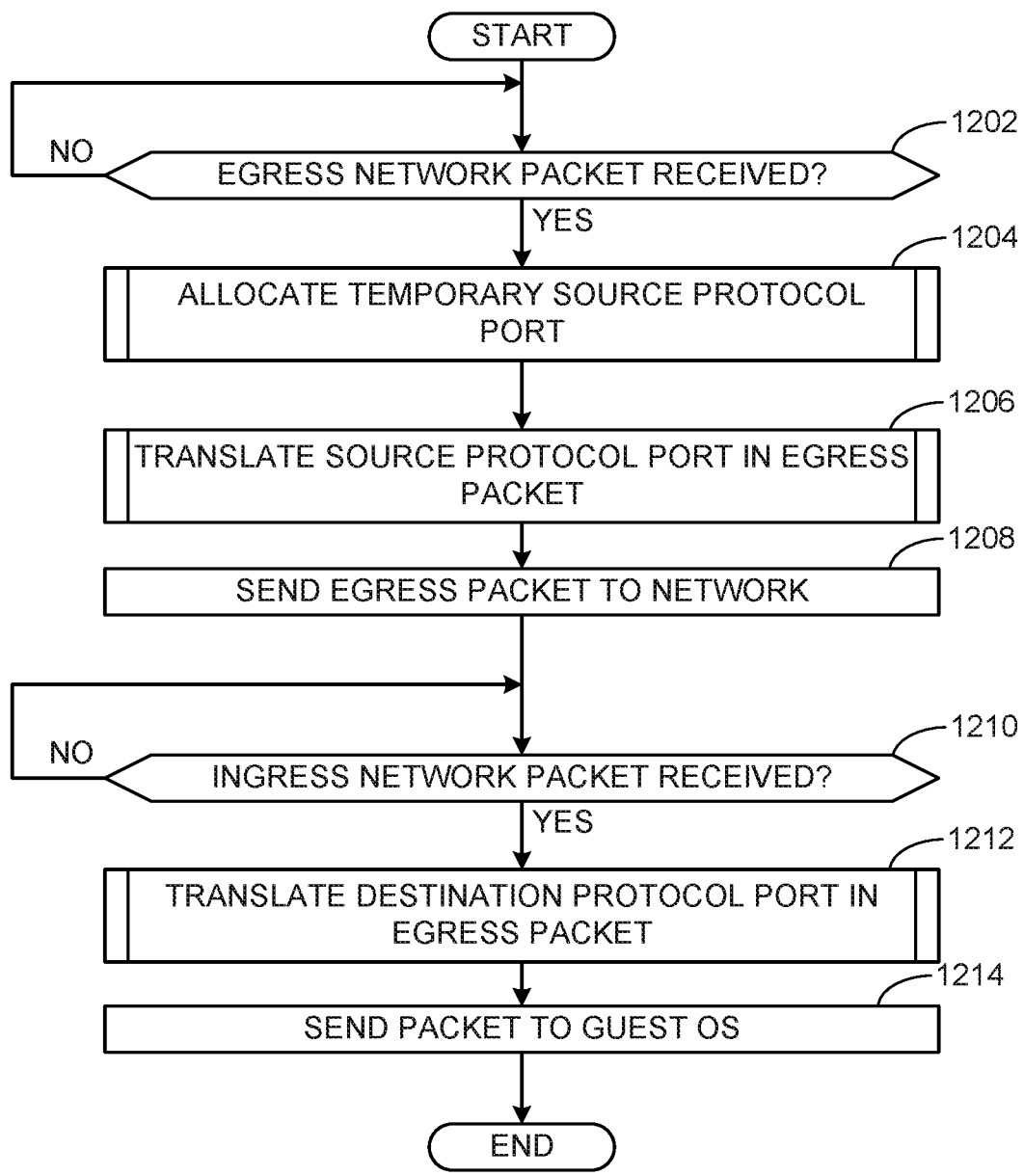
FIG. 12 is a flowchart representative of example machine readable instructions that may be executed to implement the port manager of FIGS. 1A-1C, FIG. 3, and/or FIG. 4 to allocate temporary protocol ports and perform protocol port translations in egress and ingress packets.

FIG. 12 is a flowchart representative of example machine readable instructions that may be executed to implement the port manager 158 of FIGS. 1A-1C, FIG. 3, and/or FIG. 4 to allocate the temporary source protocol ports 166 (FIGS. 1B and 1C) and perform protocol port translations in egress packets (e.g., the network packet 144 of FIGS. 1A, 1B, 5, and 6) and ingress packets (e.g., the reply network packet 506 of FIGS. 5 and 6). The example program of FIG. 12 begins at block 1202 at which the port allocator 410 (FIG. 4) determines whether an egress network packet has been received (block 1202). When an egress network packet is received, the example port allocator 410 allocates a temporary source protocol port (block 1204). For example, the port allocator 410 may perform the example process of FIG. 8 and/or the example process of FIGS. 9A-9C to allocate a temporary source protocol for the source application (e.g., the first application 118a of FIGS. 1A, 1B, 5, and 6) corresponding to the received egress network packet (e.g., the network packet 144). The example port translator 412 (FIG. 4) translates the source protocol port in the egress network packet (block 1206). For example, the port translator 412 may perform the example process of FIG. 10 to translate the source protocol port. The network stack 120 sends the egress packet to the network 128 of FIGS. 1A, 3, 5, and 6 (block 1208).

When the example port translator 412 receives an ingress network packet (block 1210), the port translator 412 translates a destination protocol port in the egress packet (block 1212). For example, the port translator 412 performs the example process of FIG. 11 to translate the destination protocol port in the egress packet. In the illustrated example, the ingress network packet processed by the port translator 412 is the reply network packet 506 of FIGS. 5 and 6. The network stack 120 sends the ingress network packet to the guest OS 116 (block 1214). The example process of FIG. 12 ends. However, the example process of FIG. 12 can be used to continue monitoring for egress network packets and/or ingress packets to allocate temporary source protocol ports, translate source protocol ports, and/or translate destination protocol ports in serial fashion and/or in parallel.

FIG. 13 is example pseudocode 1300 representative of machine readable instructions that may be executed to implement the port manager 158 of FIGS. 1A-1C, FIG. 3, and/or FIG. 4 to allocate temporary source protocol ports 166 (FIGS. 1B and 1C) to applications (e.g., the application 118a of FIGS. 1A, 1B, 5, and 6) to control network load balancing. The example pseudocode 1300 may be used to implement the machine readable instructions represented by the example flowchart of FIG. 8 and/or the example flowchart of FIGS. 9A-9C.

FIG. 14 is example pseudocode 1400 representative of machine readable instructions that may be executed to implement the port manager 158 of FIGS. 1A-1C, FIG. 3, and/or FIG. 4 to translate temporary source protocol ports 166 (FIGS. 1B and 1C) of egress packets (e.g., the network packet 144 of FIGS. 1A, 1B, 5, and 6) received from a guest OS (e.g., the guest OS 116 of FIGS. 1A, 5, and 6) for sending to a network (e.g., the network 128 of FIGS. 1A, 3, 5, and 6). The example pseudocode 1400 may be used to implement the machine readable instructions represented by the example flowchart of FIG. 10.

FIG. 15 is example pseudocode 1500 representative of machine readable instructions that may be executed to implement the port manager 158 of FIGS. 1A-1C, FIG. 3, and/or FIG. 4 to translate temporary source protocol ports 166 (FIGS. 1B and 1C) of ingress packets (e.g., the reply network packet 506 of FIGS. 5 and 6) received from a network (e.g., the network 128 of FIGS. 1A, 3, 5, and 6) for delivery to a guest OS (e.g., the guest OS 116 of FIGS. 1A, 5, and 6). The example pseudocode 1400 may be used to implement the machine readable instructions represented by the example flowchart of FIG. 11.

Figure 16:
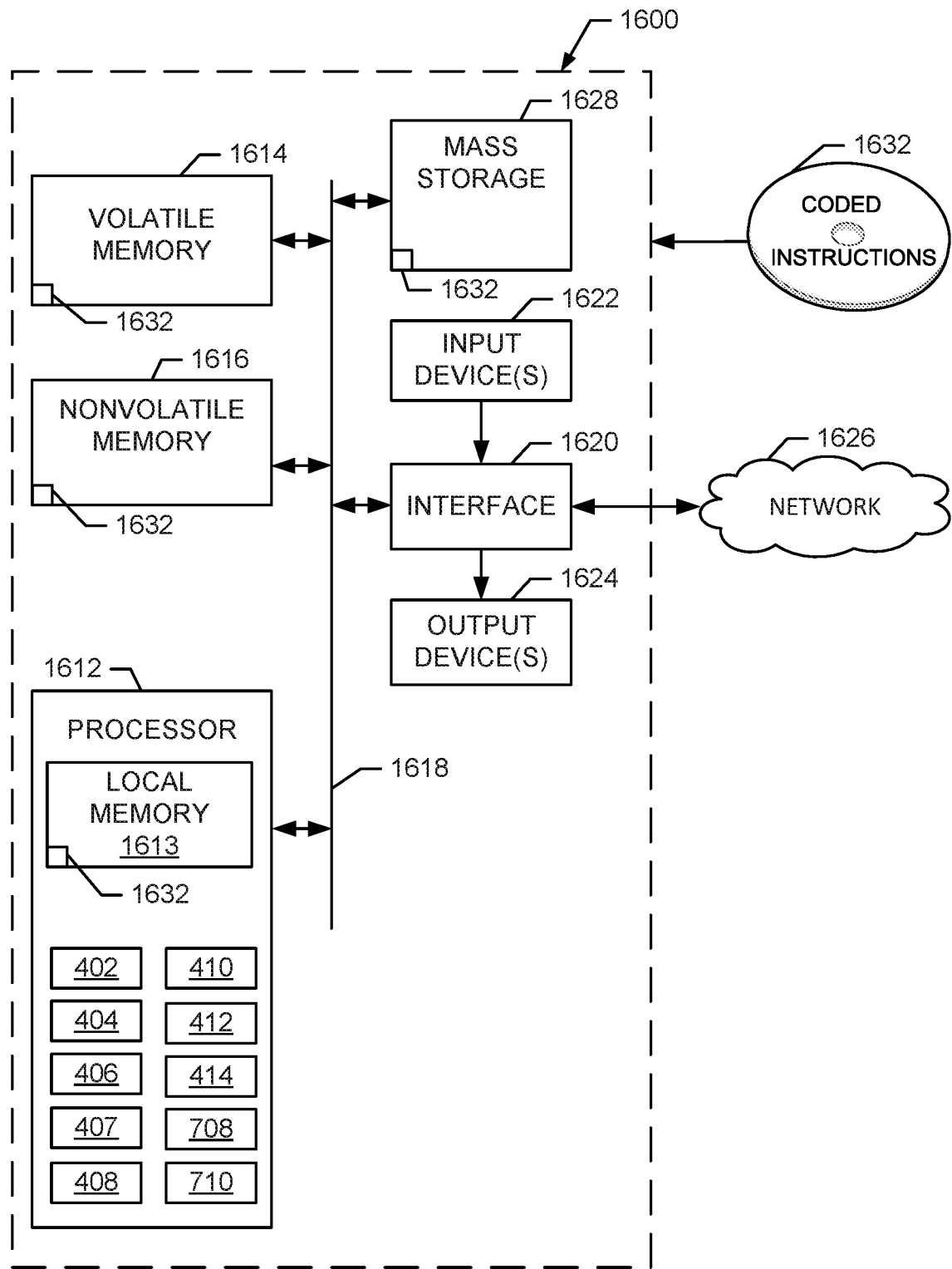
FIG. 16 is a block diagram of an example processor platform structured to execute the machine-readable instructions represented in FIGS. 8, 9A-9C, and 10-15 to implement the port manager of FIGS. 1A-1C, FIG. 3, and/or FIG. 4 to allocate unused protocol ports to applications as temporary protocol ports to control network load balancing.

FIG. 16 is a block diagram of an example processor platform 1600 structured to execute the instructions of FIGS. 8, 9A-9C, and 10-15 to implement the port manager 158 of FIGS. 1A-1C, FIG. 3, and/or FIG. 4. The processor platform 1600 can be, for example, a server, a personal computer, a workstation, a self-learning machine (e.g., a neural network), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1612 implements the example telematics network information collector 402, the example cost calculator 404, the example hash generator 406, the egress port selector 407, the example comparator 408, the example port allocator 410, the example port translator 412, and the example protocol port translation table 414 of FIG. 4, and the example analytics engine 708 and the example decision engine 710 of FIG. 7.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

Example machine executable instructions 1632 representative of the machine-readable instructions of FIGS. 8, 9A-9C, and 10-15 may be stored in the mass storage device 1628, in the volatile memory 1614, in the non-volatile memory 1616, and/or on a removable non-transitory computer readable storage medium such as a CD or DVD.

FIG. 17 is a packet flow state diagram 1700 representative of an example flow and processing of network packets (e.g., the network packet 144 of FIGS. 1A, 1B, 5, and 6) between source and destination applications based on examples disclosed herein. In the illustrated example of FIG. 17, the first application 118a of FIGS. 1A, 1B, 5, and 6 is shown as a source application 118a, and the second application 504 of FIGS. 5 and 6 is shown as a destination application 504. The example packet flow state diagram 1700 includes an example "network stack in guest OS" state 1702, an example "network stack in hypervisor" state 1704, an example "port translator in hypervisor" state 1706, an example "switch telematics" state 1708, an example "decision engine" state 1710, an example "physical network" state 1712, an example "port translator in destination hypervisor" state 1714, an example "network stack in destination hypervisor" state 1716, an example "network stack in destination guest OS" state 1718.

In the example "network stack in guest OS" state 1702, a network stack (e.g., a TCP/IP stack, a UDP/IP stack, etc.) executing in the guest OS 116 (FIGS. 1A, 5, and 6) receives the network packet 144 from the source application 118a. In the example "network stack in hypervisor" state 1704, the network stack 120 (FIG. 1A) executing in the hypervisor 110 (FIG. 1A) receives the network packet 144. In the example "port translator in hypervisor" state 1706, the port translator 412 (FIGS. 4 and 6) receives the network packet 144 and calls the port allocator 410 (FIGS. 4 and 6) implemented in, for example, the decision engine 710 (FIG. 7). The port translator 412 provides a list of unused source protocol ports and a destination protocol port to the port allocator 410. In the example "switch telematics" state 1708, the telematics agents 706a-d (FIG. 7) collect the telematics network information 168 and provide the telematics network information 168 to the port allocator 410 for use in the "decision engine" state 1710. At the example "decision engine" state 1710, the port allocator 410 uses the telematics network information 168 to perform network path cost analyses as described above in connection with FIG. 8 and/or FIGS. 9A-9C based on the unused source protocol ports for corresponding network paths to a destination IP address of the network packet 144. Also at the "decision engine" state 1710, the port allocator 410 compares the network path costs to identify a temporary source protocol port 166 having a lowest network path cost.

At the example "port translator in hypervisor" state 1706, the port translator 412 receives the temporary source protocol port 166 from the port allocator 410 and performs a protocol port translation to replace an actual source protocol port in the network packet 144 with the temporary source protocol port 166. At the example "physical network" state 1712, the network packet 144 is communicated across the network 128 (FIGS. 1A, 3, 5, and 6). At the example "port translator in destination hypervisor" state 1714, the port translator 412b (FIG. 6) translates a destination protocol port of the network packet 144 (e.g., as described above in connection with the port translation at reference numeral 630 for network packet 624 of FIG. 6). At the example "network stack in destination hypervisor" state 1716, the network stack (e.g., similar to the network stack 120 of FIG. 1A) executing in the destination hypervisor forwards the network packet 144 to a corresponding guest OS (e.g., the guest OS 502 of FIGS. 5 and 6) executing on the receiving host node (e.g., based on the destination IP address in the network packet 144). At the example "network stack in destination guest OS" state 1718, the network stack of the guest OS 502 uses the destination protocol port of the network packet 144 to identify the corresponding destination application 504, and forwards the network packet 144 to the destination application 504.

From the foregoing, it will be appreciated that example methods, apparatus and articles of manufacture have been disclosed to allocate temporary protocol ports to applications running in guest operating systems (OSs) of virtual machines (VMs) to control network load balancing of network packets sent by those applications. For example, examples disclosed herein control link selection at LAG hops and/or ECMP hops to perform better load balancing of network traffic at those hops than can be accomplished using prior LAG hop routing and/or ECMP hop routing. This improves on prior egress link selection techniques at LAG hops and/or ECMP hops that forward all or most network packets on one egress link or fewer than all available egress links. In this manner, examples disclosed herein can substantially reduce or eliminate congestion related to forwarding packets at LAG hops and/or ECMP hops.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage port allocations for network load balancing, the apparatus comprising:
   a telematics network information collector to collect bandwidth utilizations corresponding to physical links of network paths between a source and a destination, the network paths including at least one of a link aggregation group hop or an equal cost multi-path hop;
   a cost calculator to determine network path costs corresponding to unused protocol ports of a physical server host based on the bandwidth utilizations;
   a comparator to compare the network path costs; and
   a port allocator to, based on the comparison, allocate one of the unused protocol ports to an application.

2. The apparatus as defined in claim 1, wherein the unused protocol ports are at least one of transmission control protocol ports or user datagram protocol ports.

3. The apparatus as defined in claim 1, wherein the cost calculator is to determine a first one of the network path costs as a sum of a first hop cost corresponding to the link aggregation group hop and a second hop cost corresponding to the equal cost multi-path hop.

4. The apparatus as defined in claim 1, wherein the comparator is to compare the network path costs by sorting the network path costs from smallest to largest, the port allocator to allocate the one of the unused protocol ports to the application based on the one of the unused protocol ports corresponding to the least one of the network path costs.

5. The apparatus as defined in claim 1, further including:
   a hash generator to generate hash values based on the unused protocol ports; and
   an egress port selector to select egress ports of switches in the network paths based on the hash values, the bandwidth utilizations corresponding to the selected egress ports.

6. The apparatus as defined in claim 1, further including a port translator to replace an actual source protocol port in a network packet from the application with the one of the unused protocol ports as a temporary source protocol port, the network packet to be sent to the destination via a network based on the one of the unused protocol ports.

7. The apparatus as defined in claim 6, further including a protocol port translation table to store the actual source protocol port with the temporary source protocol port.

8. An apparatus to manage port assignments for network load balancing, the apparatus comprising:
   means for collecting bandwidth utilizations corresponding to physical links of network paths between a source and a destination, the network paths including at least one of a link aggregation group hop or an equal cost multi-path hop;
   means for determining network path costs corresponding to unused protocol ports of a physical server host based on the bandwidth utilizations;
   means for comparing the network path costs; and
   means for allocating one of the unused protocol ports to an application based on the comparison.

9. The apparatus as defined in claim 8, wherein the unused protocol ports are at least one of transmission control protocol ports or user datagram protocol ports.

10. The apparatus as defined in claim 8, wherein the means for determining network path costs is to determine a first one of the network path costs as a sum of a first hop cost corresponding to the link aggregation group hop and a second hop cost corresponding to the equal cost multi-path hop.

11. The apparatus as defined in claim 8, wherein the means for comparing is to compare the network path costs by sorting the network path costs from smallest to largest, the means for allocating to allocate the one of the unused protocol ports to the application based on the one of the unused protocol ports corresponding to the least one of the network path costs.

12. The apparatus as defined in claim 8, further including:
means for generating hash values based on the unused protocol ports; and
means for selecting egress ports of switches in the network paths based on the hash values, the bandwidth utilizations corresponding to the selected egress ports.

13. The apparatus as defined in claim 8, further including means for translating ports from an actual source protocol port in a network packet corresponding to the application to the one of the unused protocol ports as a temporary source protocol port, the network packet to be sent to the destination via a network based on the one of the unused protocol ports.

14. The apparatus as defined in claim 13, further including means for storing the actual source protocol port with the temporary source protocol port.

15. A non-transitory computer readable storage medium comprising instructions that, when executed, cause at least one processor to:
collect bandwidth utilizations corresponding to physical links of network paths between a source and a destination, the network paths including at least one of a link aggregation group hop or an equal cost multi-path hop;
determine network path costs corresponding to unused protocol ports of a physical server host based on the bandwidth utilizations;
compare the network path costs; and
allocate one of the unused protocol ports to an application based on the comparison.

16. The non-transitory computer readable storage medium as defined in claim 15, wherein the unused protocol ports are at least one of transmission control protocol ports or user datagram protocol ports.

17. The non-transitory computer readable storage medium as defined in claim 15, wherein the instructions are to cause the at least one processor to determine a first one of the network path costs as a sum of a first hop cost corresponding to the link aggregation group hop and a second hop cost corresponding to the equal cost multi-path hop.

18. The non-transitory computer readable storage medium as defined in claim 15, wherein the instructions are to cause the at least one processor to:
compare the network path costs by sorting the network path costs from smallest to largest, and
allocate the one of the unused protocol ports to the application based on the one of the unused protocol ports corresponding to the least one of the network path costs.

19. The non-transitory computer readable storage medium as defined in claim 15, wherein the instructions are further to cause the at least one processor to:
generate hash values based on the unused protocol ports; and
select egress ports of switches in the network paths based on the hash values, the bandwidth utilizations corresponding to the selected egress ports.

20. The non-transitory computer readable storage medium as defined in claim 15, wherein the instructions are further to cause the at least one processor to replace an actual source protocol port in a network packet from the application with the one of the unused protocol ports as a temporary source protocol port, the network packet to be sent to the destination via a network based on the one of the unused protocol ports.

21. The non-transitory computer readable storage medium as defined in claim 20, wherein the instructions are further to cause the at least one processor to store the actual source protocol port with the temporary source protocol port.

* * * * *